(12) United States Patent
Gavagni et al.

(10) Patent No.: US 7,093,129 B1
(45) Date of Patent: Aug. 15, 2006

(54) SECURED ENCRYPTED COMMUNICATIONS IN A VOICE BROWSER

(75) Inventors: Brett Gavagni, Sunrise, FL (US); Bruce D. Lucas, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1255 days.

(21) Appl. No.: 09/596,663

(22) Filed: Jun. 19, 2000

(51) Int. Cl.
*H04L 9/00* (2006.01)
*H04M 1/64* (2006.01)

(52) U.S. Cl. ............... 713/175; 713/153; 713/176; 713/201; 380/30; 379/67.1; 379/88.02; 379/88.17

(58) Field of Classification Search ............... 713/201, 713/153, 175, 176; 379/88.04, 67.1, 88.02, 379/88.17; 380/30
See application file for complete search history.

(56) References Cited

U.S. PATENT DOCUMENTS

| | | | |
|---|---|---|---|
| 6,094,485 A * | 7/2000 | Weinstein et al. | 380/30 |
| 6,603,761 B1 * | 8/2003 | Wang et al. | 370/352 |
| 6,611,869 B1 * | 8/2003 | Eschelbeck et al. | 709/228 |
| 6,681,327 B1 * | 1/2004 | Jardin | 713/153 |
| 6,707,889 B1 * | 3/2004 | Saylor et al. | 379/88.04 |
| 6,728,536 B1 * | 4/2004 | Basilier et al. | 370/328 |

OTHER PUBLICATIONS

Freier, Karlton, Kocher, *The SSL Protocol Version 3.0* (Netscape Communications Corp. Mar. 1996).
Dierks & Allen, *RFC2246—The TLS Protocol Version 1.0* (Internet Engineering Task Force, Jan. 1999).
Version 1.0 of the VoiceXML Specification published by the VoiceXML Forum by Linda Boyer, Peter Danielsen, Jim Ferrans, Gerald Karam, David Ladd, Bruce Lucas and Kenneth Rehor, *Voice eXtensible Markup Language (Voice XML ™)* Version 1.0 (W3C May 2000).

* cited by examiner

*Primary Examiner*—Gilberto Barrón, Jr.
*Assistant Examiner*—A. Nobahar
(74) *Attorney, Agent, or Firm*—Akerman Senterfitt

(57) ABSTRACT

A method for performing secured communications in a Voice Browser can include the steps of: transmitting a request from the Voice Browser to a network device for a secure communications session between the Voice Browser and the network device; receiving from the network device a digital certificate containing a public key and a reference to a certificate authority; and, authenticating the network device based on the digital certificate. Preferably, the digital certificate can be an X.509-compliant digital certificate. Subsequent to the authentication, the method can include the steps of negotiating a shared secret with the network device; encrypting data using the shared secret as an encryption key and transmitting the encrypted data to the network device; and, receiving encrypted Web content from the network device and decrypting the Web content using the shared secret as a decryption key. Significantly, the Web content can be a VoiceXML document and the Voice Browser can be a VoiceXML Browser Server.

40 Claims, 1 Drawing Sheet

SECURED ENCRYPTED COMMUNICATIONS IN A VOICE BROWSER

BACKGROUND OF THE INVENTION

1. Technical Field

This invention relates to the field of computer audio user interfaces and more particularly to a system and method for performing secured communications between a voice browser and a server.

2. Description of the Related Art

Privacy in data communications has become a significant issue with the exponential increase in e-commerce transactions on the Internet. Typically a client computer and server computer require that exchanged information remain private to both parties. For instance, in an online banking transaction, the client requires that the sharing of the client's account number and password include only the intended bank and no other party. Presently, privacy in data transactions can be secured only in selected applications protocols through the use of security technologies which can incorporate either asymmetric, symmetric or a combination of asymmetric and symmetric encryption algorithms. The Secured Sockets Layer ("SSL") protocol represents one such security technology which incorporates both asymmetric and symmetric encryption algorithms.

SSL is a transport-layer protocol that can be established between a client and a server. SSL is typically integrated directly with selected underlying application protocols. For example, the Hypertext Transfer Protocol ("HTTP") has been successfully integrated with SSL. Specifically, HTTP packets are encapsulated in SSL packets and are transported over TCP/IP. HTTP integrated with SSL is commonly referred to as "HTTPS" and can be used to securely view and exchange Web-based content encoded in hypertext markup language ("HTML"). Other protocols integrated with SSL include Telnet, the File Transfer Protocol ("FTP"), the Lightweight Directory Access Protocol ("LDAP"), the Internet Message Access Protocol ("IMAP"), and the Network News Transfer Protocol ("NNTP").

SSL is intended to provide a secure pipe between a client and a server. SSL is session-oriented and can maintain state, despite the execution of SSL over such protocols as HTTP which, in of itself, is stateless. Finally, SSL provides privacy through encryption, both asymmetric and symmetric, authentication based upon certificates, a vehicle for authorization through SSL's support for certificates, integrity by incorporating hash functions, and digital signing as part of the transport protocol.

Briefly, in an SSL compliant visual Web browser executing the "HTTPS" protocol, an SSL session can be established when a client selects a uniform resource locator ("URL") referencing a server compliant with the HTTPS protocol. The server can respond by delivering to the client, an X.509 certificate containing a distinguished name referencing a Certificate Authority ("CA") and a public key. The client can examine the server certificate by referencing the issuing CA and can verify the integrity of the server certificate if the issuing CA is configured in the visual Web browser as trustworthy. Subsequently, the server can perform optional client authentication by requesting a certificate from the client. The server, too, can examine the client certificate by referencing the issuing CA and can verify the integrity of the client certificate if both the client and the issuing CA are configured in the server as trustworthy. If the server successfully authenticates the client certificate, the SSL session can continue. Otherwise, the session can be terminated.

Subsequently, the client can "challenge" the server using asymmetrical encryption technology in order to verify that the server indeed possesses the private key associated with the public key contained in the server certificate. In challenging the server, the client can generate a random string of data and can encrypt the random string of data using the server's public key contained in the server certificate. The client can transmit the encrypted data to the server and can request that the server deliver the data to the client. In order to deliver the data to the client, however, the server first must decrypt the data using the server's private key which corresponds to the server's public key contained in the server certificate. Optionally, the server, too, can challenge the client using a similar exchange of encrypted data.

Once the client and server have been mutually authenticated, the client and the server can agree upon a shared secret for use in future symmetrical encryption and decryption operations. Typically, the client can select the secret and encrypt the selected secret using the server's public key. The client can transmit the asymmetrically encrypted secret to the server so that only the client and the server share the common secret. When both the client and the server have agreed upon the shared secret, symmetrical data transfer can begin between the client and the server using the shared secret as the key to the symmetrical encryption and corresponding decryption operations. Notably, a more thorough treatment of the SSL protocol has been published by Netscape Communications Corporation of Mountain View, Calif. in Freier, Karlton, Kocher, *The SSL Protocol Version 3.0* (Netscape Communications Corp. March 1996), incorporated herein by reference. Additionally, an SSL 3.0 compatible standard has been approved by the Internet Engineering Task Force ("IETF") and has been published by the IETF as Dierks & Allen, *RFC2246—The TLS Protocol Version 1.0* (IETF January 1999), incorporated herein by reference.

Unlike visual Web browsers executing the HTTPS protocol, SSL has not been integrated with Voice Browsers. Generally, a Voice Browser, unlike a visual Web browser, does not permit a user to interact with Web-based content visually. Rather, a Voice Browser, which can operate in conjunction with a Speech Recognition Engine and Speech Synthesis Engine, can permit the user to interact with Web-based content audibly. That is, the user can provide voice commands to navigate from Web-based document to document. Likewise, Web-based content can be presented to the user audibly, typically in the form of speech synthesized text. Thus, Voice Browsers can provide voice access and interactive voice response to Web-based content and applications, for instance by telephone, personal digital assistant, or desktop computer.

Significantly, Voice Browsers can be configured to interact with Web-based content encoded in VoiceXML. VoiceXML is a markup language for distributed voice applications based on extended markup language ("XML"), much as HTML is a markup language for distributed visual applications. VoiceXML is designed for creating audio dialogs that feature synthesized speech, digitized audio, recognition of spoken and Dual Tone Multifrequency ("DTMF") key input, recording of spoken input, telephony, and mixed-initiative conversations. Version 1.0 of the VoiceXML specification has been published by the VoiceXML Forum in the document Linda Boyer, Peter Danielsen, Jim Ferrans, Gerald Karam, David Ladd, Bruce Lucas and Kenneth Rehor,

*Voice extensible Markup Language* (VoiceXML™) version 1.0, (W3C May 2000), incorporated herein by reference. Additionally, Version 1.0 of the VoiceXML specification has been submitted to the World Wide Web Consortium by the VoiceXML Forum as a proposed industry standard.

Version 1.0 of the VoiceXML specification provides a high-level programming interface to speech and telephony resources for application developers, service providers and equipment manufacturers. As noted in W3C submission, standardization of VoiceXML will simplify creation and delivery of Web-based, personalized interactive voice-response services; enable phone and voice access to integrated call center databases, information and services on Web sites, and company intranets; and help enable new voice-capable devices and appliances. Still, the VoiceXML specification lacks a mechanism for secure communications through encrypted network transmissions via the SSL protocol over the TCP/IP protocol. Accordingly, what is needed is a Voice Browser incorporating SSL support for performing secure communications in a data communications network.

SUMMARY OF THE INVENTION

The present invention is a Voice Browser for processing VoiceXML encoded Web content through a secure connection established using symmetric and asymmetric encryption techniques. In the preferred embodiment, the symmetric and asymmetric encryption techniques are included in a Java implementation of the SSL 3.0 protocol for providing secure communications through encrypted network transmissions between a VoiceXML-compliant Voice Browser Server and a network device. Specifically, the method of the present invention can authenticate the network device and negotiate a shared secret between the client and the server using asymmetrical encryption techniques. Subsequently, the method of the present invention can facilitate secure communications between the client and the server of data in a VoiceXML document using symmetrical encryption techniques.

The method of the invention can include the steps of transmitting a request to the network device to establish a secured communication session between the Voice Browser and the network device and authenticating the network device. Subsequent to the authentication, a shared secret can be negotiated between the network device and the Voice Browser. Once a shared secret has been negotiated, VoiceXML-based Web content can be encrypted using the shared secret as an encryption key. Additionally, the encrypted VoiceXML-based Web content can be exchanged between the network device and the Voice Browser. Finally, the VoiceXML-based Web content can be decrypted using the shared secret as a decryption key. Significantly, the Voice Browser can be a VoiceXML Browser Server.

The step of authenticating the network device can include transmitting a digital certificate from the network device to the Voice Browser and validating the certificate authority. The digital certificate can have a public key and a reference to a certificate authority. Specifically, the digital certificate can be an X.509-compliant digital certificate. Optionally, the method can further include the step of authenticating the Voice Browser. The step of authenticating the Voice Browser can include transmitting a digital certificate from the Voice Browser to the network device and validating the certificate authority. As before, the digital certificate can have a public key and a reference to a certificate authority. Specifically, the digital certificate can be an X.509-compliant digital certificate.

The step of authenticating the network device can further include the step of challenging the network device. Likewise, the step of authenticating the Voice Browser can further include the step of challenging the Voice Browser. The step of challenging the network device can include encrypting a message using the public key contained in the digital certificate; transmitting the encrypted message from the Voice Browser to the network device; decrypting the encrypted message using a private key corresponding to the public key; and, transmitting the decrypted message to the Voice Browser. Similarly, the step of challenging the Voice Browser can include encrypting a message using the public key contained in the digital certificate; transmitting the encrypted message from the network device to the Voice Browser; decrypting the encrypted message using a private key corresponding to the public key; and, transmitting the decrypted message to the network device.

In the preferred embodiment, the negotiating step can include the steps of: generating a key for use in a symmetric cryptographic algorithm; encrypting the generated key with the public key; transmitting the encrypted key to the network device; and, decrypting the key in the network device with a private key corresponding to the public key. Alternatively, the negotiating step can include the steps of: generating a key for use in a symmetric cryptographic algorithm; encrypting the generated key with the public key; transmitting the encrypted key to the Voice Browser; and, decrypting the key in the Voice Browser with a private key corresponding to the public key.

In the preferred embodiment, the method of the present invention can further include the steps of: exchanging a list of supported symmetrical cryptographic algorithms for the network device and the Voice Browser; selecting a symmetrical cryptographic algorithm from the list; and, performing the encrypting and decrypting steps using the selected symmetrical cryptographic algorithm.

A method for performing secured communications in a Voice Browser can include the steps of: transmitting a request from the Voice Browser to a network device for a secure communications session between the Voice Browser and the network device; receiving from the network device a digital certificate containing a public key and a reference to a certificate authority; and, authenticating the network device based on the digital certificate. Preferably, the digital certificate can be an X.509-compliant digital certificate.

Subsequent to the authentication, the method can include the steps of negotiating a shared secret with the network device; encrypting data using the shared secret as an encryption key and transmitting the encrypted data to the network device; and, receiving encrypted Web content from the network device and decrypting the Web content using the shared secret as a decryption key. Significantly, the Web content can be a VoiceXML document and the Voice Browser can be a VoiceXML Browser Server.

In the preferred embodiment, the transmitting step can further include the steps of: transmitting to the network device a list of supported encryption algorithms for use in the encryption and decryption steps. Notably, the network device can select an encryption algorithm from among the list. Subsequently, the data can be encrypted using the selected encryption algorithm and the Web content can be decrypted using the encryption algorithm.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
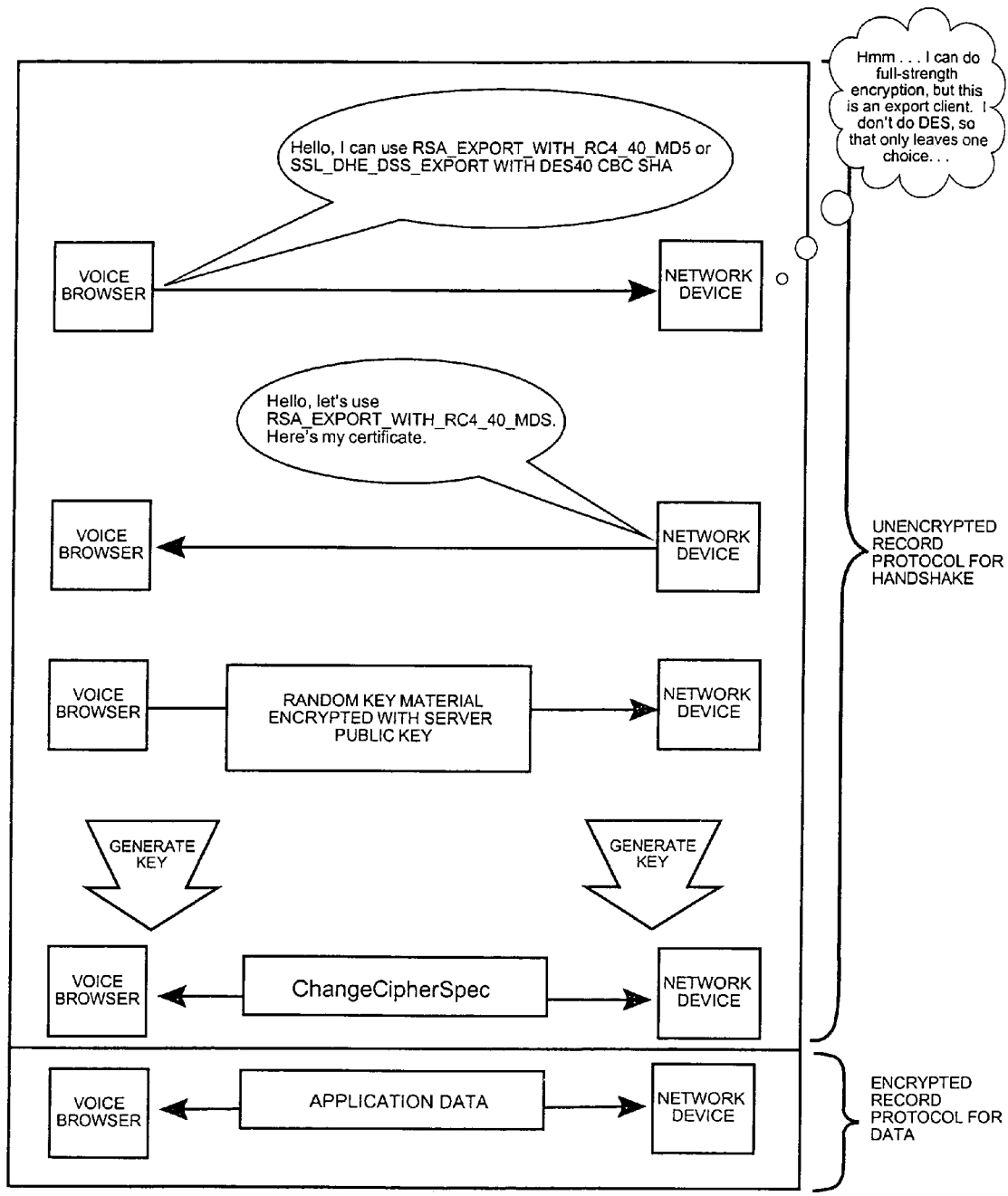
FIG. 1 is an illustration of the establishment of a secured communications session between a Voice Browser and a network device.

The present invention is a Voice Browser enabled to perform secured communications with a network device. In particular, the Voice Browser can request a secured connection with a network device. Subsequently, the Voice Browser can receive a response from the network device in which the network device can acknowledge the request of the Voice Browser. Upon receiving the acknowledgment from the network device, the Voice Browser can authenticate the network device in order to ensure the identity of the network device. If the Voice Browser determines the identity of the network device to be authentic, the Voice Browser and the network device can select a shared secret to be used as an encryption key during an ensuing secured communications session. Finally, the Voice Browser and the network device can perform secured communications using the shared secret as an encryption key.

Advantageously, the secured communications functionality provided to the Voice Browser can be the result of the combination of a secured communications interface in the Voice Browser and a platform-independent, standards-based implementation of the Secured Sockets Layer ("SSL") secured communications protocol. In the preferred embodiment, the standards-based, platform-independent implementation of the SSL protocol is the SSLite for Java™ SSL implementation library manufactured by IBM Corporation of Armonk, N.Y. A class hierarchy for SSLite is attached hereto in Appendix A. Additionally, Javadocs documentation for each class listed in Appendix A are provided in Appendixes B–E. Specifically, Appendix B describes the class HttpsURLConnection, Appendix C describes the class HttpsClient, Appendix D describes the class HttpsURLStreamHandlerFactory and Appendix E describes the class HttpsURLStreamHandler. Still, the invention is not limited in regard to the particular secured communications library to be combined with the secured communications interface. In particular, the present invention can also incorporate the Transport Layer Security ("TLS") protocol defined by the Transport Layer Security Working Group of the Internet Engineering Task Force, the Kerberos protocol developed by the Massachusetts Institute of Technology, or other suitable secured communications protocols.

FIG. 1 illustrates a simplified approach to SSL secured communications between a Voice Browser and a network device. As shown in FIG. 1, First, for an SSL connection to become established between the Voice Browser and the network device, an SSL handshake is performed. Specifically, the Voice Browser can transmit to the network device a "client hello" message. The client hello message can include a request for a connection with the network device in addition to the capabilities of the client, for example the preferred secured communications protocol, the cipher suites available to perform encryption and supported data compression methods. The network device can acknowledge the client hello message with a "server hello" message which can include a cipher suite selected from the cipher suites listed in the client hello message, and a compression method selected from the list of supported encryption methods. Notably, if the network device is unable to support any of the encryption algorithms contained in the cipher suite provided by the Voice Browser, the network device can notify the Voice Browser that the handshake attempt has failed. Subsequently, the connection between the Voice Browser and the network device can be closed.

Still, if handshake attempt is successful, the network device can transmit to the Voice Browser a digital certificate which can contain the network device's public key in addition to a reference to a certificate authority which acts as a trusted repository for digital certificates. The Voice Browser can authenticate the digital certificate by verifying that the certificate authority is a trusted repository of digital certificates. If the Voice Browser can successfully authenticate the certificate authority, a secure connection can be established. Notably, the network device can optionally authenticate the Voice Browser in the same the Voice Browser authenticates the network device. Notwithstanding, mutual authentication is not required in the present invention and the scope of the present invention is not to be limited in this regard.

Once the authentication process has been completed, the Voice Browser can transmit a "ClientKeyExchange" message to the network device. Specifically, the ClientKeyExchange message is a shared secret which has been encrypted using the public key of the network device, received in the digital certificate of the network device. The shared secret can be a randomly generated key for use in a symmetrical encryption algorithm. Despite the generation of the random key, however, the network device still preferably verifies that an identical key is not already in use with another client, be it another Voice Browser or other client application. If the network device determines that the key is already in use, the network device can notify the Voice Browser that another key must be generated. Notably, the invention is not limited in regard to the mechanism for generating a key. Rather, the key can be predetermined and stored in a database, generated according to a pre-defined algorithm, or other suitable key generation or key selection method.

When the Voice Browser and the network device have agreed upon a shared secret, specifically a common symmetric key for encrypting subsequently communications, both the Voice Browser and the network device can exchange a "ChangeCipherSpec" message confirming that both are ready to begin secured communications. Subsequently, the Voice Browser and the network device can begin secure communications using a symmetrical encryption algorithm with the shared secret as the encryption key.

With regard to the particular implementation of the present invention in which the SSL secured communications protocol is combined with secured communications interface of the Voice Browser, the SSL secured communications library can contain an "HttpsURLConnection" object which can provide methods for performing secured communications with HTTP servers. A complete description of the HttpsURLConnection class is included in the Javadoc "Class HttpsURLConnection" attached hereto as Appendix B. As is apparent from the class hierarchy of Appendix A, the HttpsURLConnection class is derived from the Java extension HttpURLConnection. Accordingly, the class HttpsURLConnection is a platform-independent, standards-based implementation of the SSL protocol.

The following is a source code listing for a preferred interface between the Voice Browser and the secured communications protocol, specifically SSL. As is apparent from the source code, the following steps are minimally performed in order to establish a secured connection to a network device. First, a URL object is defined and instantiated for a fully-qualified URL. Concurrently, a stream handler is established for handling data streams received from the fully-qualified URL. Second, an unsecured connection is established with a network device addressed by the URL in which the symmetrical encryption algorithm can be specified in addition to the compression method. Also, the authentication process can be performed and a shared secret negotiated. Third, a secure connection can be established using the shared secret as a key to the selected encryption method.

```
import java.io.*;
import java.util.*;
import java.net.*;
import com.ibm.speech.net.www.protocol.https.*;
//begin class VoiceXMLBrowserServer
public class VoiceXMLBrowserServer
{
   public static void main(String args[ ])
   {
      try
      {
         String fullQualURL = new String ("https://www.ibm.com/software/speech/vxmlpage.vxml");
         URL url;
         URL.setURLStreamHandlerFactory(new HttpsURLStreamHandlerFactory( ));
         //Create file for inputstream dump
         FileOutputStream fout = new FileOutputStream("fetched.vxml");
         //Create URL object
         url = new URL(fullQualURL);
         //Setup Connection
         HttpsURLConnection conn = (HttpsURLConnection) url.openConnection( );
         //SSL Implementation Specific API Extensions.
         //Optional usage, defaults included with implementation distribution
         //(Documented usage in Javadoc API definition)
         conn.setKeyRingDatabase("ralvs6");    //Set keyring database to use.
                                               //Default is specified as provided with implementation.
         conn.setTimeout(3);                   //Set connection timeout in seconds.
         conn.setAsyncConnections = true;      //Set SSL messages to be processed asynchronously
                                               //by a dedicated thread.
         conn.setEnabledCompressionMethods("IBM_ZIP_SPEED");       //Set compression method.
         conn.setEnabledCipherSuites("   SSL_RSA_WITH_RC4_128_MD5
                                         SSL_RSA_WITH_RC4_128_SHA");
         //Set enabled cipher suites (Encryption Algorithms)
         HttpURLConnection API (Standard Java platform networking API)
         conn.setRequestMethod("POST");
         conn.setRequestProperty("Content-Type", "application/x-www-form-urlencoded");
         conn.setRequestProperty("accept", "text/vxml");
         //Initiate secure connection
         conn.connect( );
         //Get inputstream and do something with it
         if (conn.getInputStream( )!=null)
         {
            BufferedReader in = new BufferedReader(new InputStreamReader(conn.getInputStream( )));
            String line;
            while ((line = in.readLine( )) != null)
            {
               line = line + "\n";
               fout.write(line.getBytes( ));
            }
         }
         //Close connection
         conn.disconnect( );
      }
      catch (Exception e)
      {
         System.out.println("Error: " + e.getMessage( ));
         e.printStackTrace( );
      }
   }
}
//end class VoiceXMLBrowserServer
```

The preferred design and implementation of the present invention can be performed entirely in the Java programming language so as to avoid platform dependencies. As such, the preferred design and implementation of the present invention is an "Optional Package". Optional packages, formerly known as "standard" extensions or "extensions" are packages of Java classes and associated native code that application developers can use to extend the functionality of the core platform. The extension mechanism allows a Java virtual machine (VM) to use the optional-package classes in much the same way as the VM uses bootstrap classes. Like bootstrap classes, classes in optional packages do not have to be placed on the class path. Also, the extension mechanism provides a method for needed optional packages to be retrieved from specified URLs when they are not already installed in the Java 2 Runtime Environment or Java 2 SDK.

Optional packages are embodied in JAR files, in which every JAR file is a potential optional package. A JAR file can be made to play the role of an optional package in two ways: First, by being placed in a special location in the Java 2 Runtime Environment or Java 2 SDK directory structure—in which case it is an "installed" optional package; and second, by being referenced in a specified way from the manifest of the JAR file of an applet or application—in which case it is a "download" optional package. When the VM is searching for a class of a particular name, it will first look among the bootstrap classes. If it fails to find the desired class there, it will next look for the class among any installed optional packages. If it doesn't find the class among either the bootstrap classes or the installed optional packages, the VM will search among any download optional packages referenced by the application or applet. The VM only searches the class path if it fails to find a class among the bootstrap classes or optional package classes.

The preferred embodiment of the present invention provides an abstraction of the underlying complicated key exchange, handshake and encrypted data transmission associated with secure data communications. In consequence, a Voice Browser in accordance with the inventive arrangements can access the abstracted method of the present invention through a reference to a library including an implementation of the performing secured data communications. Hence, the present invention addresses the problem of secured communications in a Voice Browser by providing a Voice Browser incorporating SSL support for performing secure communications in a data communications network.

The method of the invention can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods. A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

6169-159

APPENDIX A

Class Hierarchy class java.lang.Object
- class.com.ibm.speech.net.www.protocol.https.HttpsURLStreamHandlerFactory (implements java.net.URLStreamHandlerFactory)
  - class com.ibm.sslight.SSLContext (implements java.lang.Cloneable)
    - class com.ibm.speech.net.www.protocol.https.HttpsClient
  - class java.net.URLConnection
    - class java.net.HttpURLConnection
      - class com.ibm.speech.net.www.protocol.https.HttpsURLConnection
  - class java.net.URLStreamHandler
    - class com.ibm.speech.net.www.protocol.https.HttpsURLStreamHandler

APPENDIX B

Class HttpsURLConnection

Class Tree Deprecated Index Help
PREV CLASS  NEXT CLASS                                FRAMES  NO FRAMES
SUMMARY: INNER | FIELD | CONSTR | METHOD              DETAIL: FIELD | CONSTR | METHOD com.ibm.speech.net.www.protocol.https
Class HttpsURLConnection

```
java.lang.Object
  |
  +--java.net.URLConnection
        |
        +--java.net.HttpURLConnection
              |
              +--com.ibm.speech.net.www.protocol.https.HttpsURLConnection
``` public class HttpsURLConnection
extends java.net.HttpURLConnection

The class `HttpsURLConnection` represents a communications link between the application and a URL. Instances of this class can be used both to read from and to write to the resource referenced by the URL. In general, creating a connection to a URL is a multistep process:

| openConnection() | connect() |
|---|---|
| Manipulate parameters that affect the connection to the remote resource. | Interact with the resource; query header fields and contents. |

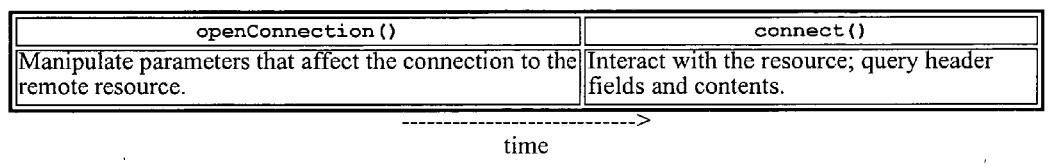

---------------------------->
time

1. The connection object is created by invoking the `openConnection` method on a URL.
2. The setup parameters and general request properties are manipulated.
3. The actual connection to the remote object is made, using the `connect` method.
4. The remote object becomes available. The header fields and the contents of the remote object can be accessed.

The setup parameters are modified using the following methods:

- `setAllowUserInteraction`
- `setDoInput`
- `setDoOutput`
- `setIfModifiedSince`
- `setUseCaches` and the general request properties are modified using the method:

- `setRequestProperty`

Default values for the `AllowUserInteraction` and `UseCaches` parameters can be set using the methods `setDefaultAllowUserInteraction` and `setDefaultUseCaches`. Default values for general request properties can be set using the `setDefaultRequestProperty` method.

Each of the above `set` methods has a corresponding `get` method to retrieve the value of the parameter or general request property. The specific parameters and general request properties that are applicable are protocol specific.

The following methods are used to access the header fields and the contents after the connection is made to the remote object:

- `getContent`
- `getHeaderField`
- `getInputStream`
- `getOutputStream`

Certain header fields are accessed frequently. The methods:

- `getContentEncoding`
- `getContentLength`
- `getContentType`
- `getDate`
- `getExpiration`
- `getLastModifed` provide convenient access to these fields. The `getContentType` method is used by the `getContent` method to determine the type of the remote object; subclasses may find it convenient to override the `getContentType` method.

In the common case, all of the pre-connection parameters and general request properties can be ignored: the pre-connection parameters and request properties default to sensible values. For most clients of this interface, there are only two interesting methods: `getInputStream` and `getObject`, which are mirrored in the `URL` class by convenience methods.

`HttpsURLConnection` is a URLConnection with support for HTTPS-specific features. See the spec for details.

| Field Summary | |
|---|---|
| static int | HTTP_ACCEPTED |
| static int | HTTP_BAD_GATEWAY |
| static int | HTTP_BAD_METHOD |
| static int | HTTP_BAD_REQUEST<br>4XX: client error |
| static int | HTTP_CLIENT_TIMEOUT |
| static int | HTTP_CONFLICT |
| static int | HTTP_CREATED |

: Class HttpsURLConnection

| static int | HTTP_ENTITY_TOO_LARGE |
|---|---|
| static int | HTTP_FORBIDDEN |
| static int | HTTP_GATEWAY_TIMEOUT |
| static int | HTTP_GONE |
| static int | HTTP_INTERNAL_ERROR |
| static int | HTTP_LENGTH_REQUIRED |
| static int | HTTP_MOVED_PERM |
| static int | HTTP_MOVED_TEMP |
| static int | HTTP_MULT_CHOICE<br>    3XX: relocation/redirect |
| static int | HTTP_NO_CONTENT |
| static int | HTTP_NOT_ACCEPTABLE |
| static int | HTTP_NOT_AUTHORITATIVE |
| static int | HTTP_NOT_FOUND |
| static int | HTTP_NOT_MODIFIED |
| static int | HTTP_OK<br>    2XX: generally "OK" |
| static int | HTTP_PARTIAL |
| static int | HTTP_PAYMENT_REQUIRED |
| static int | HTTP_PRECON_FAILED |
| static int | HTTP_PROXY_AUTH |
| static int | HTTP_REQ_TOO_LONG |
| static int | HTTP_RESET |
| static int | HTTP_SEE_OTHER | file://H:\CLIENTS\IBM\159\com\ibm\speech\net\www\protocol\h...\HttpsURLConnection.htm  6/14/00

: Class HttpsURLConnection

| | |
|---|---|
| static int | HTTP_SERVER_ERROR<br>5XX: server error |
| static int | HTTP_UNAUTHORIZED |
| static int | HTTP_UNAVAILABLE |
| static int | HTTP_UNSUPPORTED_TYPE |
| static int | HTTP_USE_PROXY |
| static int | HTTP_VERSION |

| Fields inherited from class java.net.HttpURLConnection |
|---|
| HTTP_ACCEPTED, HTTP_BAD_GATEWAY, HTTP_BAD_METHOD, HTTP_BAD_REQUEST, HTTP_CLIENT_TIMEOUT, HTTP_CONFLICT, HTTP_CREATED, HTTP_ENTITY_TOO_LARGE, HTTP_FORBIDDEN, HTTP_GATEWAY_TIMEOUT, HTTP_GONE, HTTP_INTERNAL_ERROR, HTTP_LENGTH_REQUIRED, HTTP_MOVED_PERM, HTTP_MOVED_TEMP, HTTP_MULT_CHOICE, HTTP_NO_CONTENT, HTTP_NOT_ACCEPTABLE, HTTP_NOT_AUTHORITATIVE, HTTP_NOT_FOUND, HTTP_NOT_MODIFIED, HTTP_OK, HTTP_PARTIAL, HTTP_PAYMENT_REQUIRED, HTTP_PRECON_FAILED, HTTP_PROXY_AUTH, HTTP_REQ_TOO_LONG, HTTP_RESET, HTTP_SEE_OTHER, HTTP_SERVER_ERROR, HTTP_UNAUTHORIZED, HTTP_UNAVAILABLE, HTTP_UNSUPPORTED_TYPE, HTTP_USE_PROXY, HTTP_VERSION, method, responseCode, responseMessage |

| Fields inherited from class java.net.URLConnection |
|---|
| allowUserInteraction, connected, doInput, doOutput, ifModifiedSince, url, useCaches |

Constructor Summary

| | |
|---|---|
| | HttpsURLConnection(java.net.URL u)<br>    Creates a new HttpsURLConnection instance to the object referenced by the URL argument with the default debug flag. |
| | HttpsURLConnection(java.net.URL u, boolean dbg)<br>    Creates a new HttpsURLConnection instance to the object referenced by the URL argument with a specified debug flag. |

Method Summary

| | |
|---|---|
| void | connect()<br>    Opens a communications link to the resource referenced by this URL, if such a connection has not already been established. |
| void | disconnect()<br>    Close the connection to the server. |
| boolean | getAllowUserInteraction()<br>    Returns the value of the allowUserInteraction field for this object. | file://H:\CLIENTS\IBM\159\com\ibm\speech\net\www\protocol\h...\HttpsURLConnection.htm 6/14/00

: Class HttpsURLConnection

| | | |
|---:|---|---|
| java.lang.String | getContentEncoding() <br> Returns the value of the `content-encoding` header field. | |
| int | getContentLength() <br> Returns the value of the `content-length` header field. | |
| java.lang.String | getContentType() <br> Returns the value of the `content-type` header field. | |
| long | getDate() <br> Returns the value of the `date` header field. | |
| static boolean | getDefaultAllowUserInteraction() <br> Returns the default value of the `allowUserInteraction` field. | |
| static java.lang.String | getDefaultRequestProperty(java.lang.String key) <br> Returns the value of the default request property. | |
| boolean | getDefaultUseCaches() <br> Returns the default value of a `URLConnection`'s `useCaches` flag. | |
| boolean | getDoInput() <br> Returns the value of this `URLConnection`'s `doInput` flag. | |
| boolean | getDoOutput() <br> Returns the value of this `URLConnection`'s `doOutput` flag. | |
| java.io.InputStream | getErrorStream() <br> Returns the error stream if the connection failed but the server sent useful data nonetheless. | |
| long | getExpiration() <br> Returns the value of the `expires` header field. | |
| static java.net.FileNameMap | getFileNameMap() <br> Returns the FileNameMap. | |
| static boolean | getFollowRedirects() | |
| java.lang.String | getHeaderField(int n) <br> Returns the value for the $n^{th}$ header field. | |
| java.lang.String | getHeaderField(java.lang.String name) <br> Returns the name of the specified header field. | |
| long | getHeaderFieldDate(java.lang.String name, long Default) <br> Returns the value of the named field parsed as date. | |
| int | getHeaderFieldInt(java.lang.String name, int Default) <br> Returns the value of the named field parsed as a number. | |
| java.lang.String | getHeaderFieldKey(int n) <br> Returns the key for the $n^{th}$ header field. | |
| java.lang.String | getHTTPHeader() <br> Returns the entire of the HTTP header received from server request. | |
| long | getIfModifiedSince() <br> Returns the value of this object's `ifModifiedSince` field. | |
| java.io.InputStream | getInputStream() <br> Returns an input stream that reads from this open connection. | |

Class HttpsURLConnection

| | |
|---:|---|
| long | getLastModified()<br>Returns the value of the `last-modified` header field. |
| java.io.OutputStream | getOutputStream()<br>Returns an output stream that writes to this connection. |
| java.security.Permission | getPermission()<br>Returns a permission object representing the permission necessary to make the connection represented by this object. |
| java.lang.String | getRequestMethod()<br>Get the request method. |
| java.lang.String | getRequestProperty(java.lang.String key)<br>Returns the value of the named general request property for this connection. |
| int | getResponseCode()<br>Gets HTTP response status. |
| java.lang.String | getResponseMessage()<br>Gets the HTTP response message, if any, returned along with the response code from a server. |
| java.net.URL | getURL()<br>Returns the value of this `URLConnection`'s URL field. |
| boolean | getUseCaches()<br>Returns the value of this `URLConnection`'s useCaches field. |
| protected static java.lang.String | guessContentTypeFromName(java.lang.String fname)<br>Tries to determine the content type of an object, based on the specified "file" component of a URL. |
| static java.lang.String | guessContentTypeFromStream(java.io.InputStream is)<br>Tries to determine the type of an input stream based on the characters at the beginning of the input stream. |
| void | setAllowUserInteraction(boolean allowuserinteraction)<br>Set the value of the `allowUserInteraction` field of this `URLConnection`. |
| void | setAsynConnections(boolean value)<br>Sets the value of the `asyncConnectionSet` field for the `HttpsURLConnection` object to the specified value. |
| static void | setContentHandlerFactory<br>(java.net.ContentHandlerFactory fac)<br>Sets the `ContentHandlerFactory` of an application. |
| static void | setDefaultAllowUserInteraction<br>(boolean defaultallowuserinteraction)<br>Sets the default value of the `allowUserInteraction` field for all future `URLConnection` objects to the specified value. |
| static void | setDefaultRequestProperty(java.lang.String key, java.lang.String value)<br>Sets the default value of a general request property. |
| void | setDefaultUseCaches(boolean defaultusecaches)<br>Sets the default value of the `useCaches` field to the specified value. |

| | | |
|---:|---|---|
| void | setDoInput(boolean doinput) | |
| | Sets the value of the `doInput` field for this `URLConnection` to the specified value. | |
| void | setDoOutput(boolean dooutput) | |
| | Sets the value of the `doOutput` field for this `URLConnection` to the specified value. | |
| void | setEnableCipherSuites(java.lang.String cipherSuites) | |
| | Sets the value of the `enabledCipherSuites` field for the `HttpsURLConnection` object to the specified value. | |
| void | setEnabledCompressionMethods(java.lang.String methods) | |
| | Sets the value of the `enabledCompressionMethods` field for the `HttpsURLConnection` object to the specified value. | |
| static void | setFileNameMap(java.net.FileNameMap map) | |
| | Sets the FileNameMap. | |
| static void | setFollowRedirects(boolean set) | |
| | Sets whether HTTP redirects (requests with response code 3xx) should be automatically followed by this class. | |
| void | setIfModifiedSince(long ifmodifiedsince) | |
| | Sets the value of the `ifModifiedSince` field of this `URLConnection` to the specified value. | |
| void | setKeyRingDatabase(java.lang.String name) | |
| | Sets the value of the `keyRingDatabase` field for the `HttpsURLConnection` object to the specified value. | |
| void | setRequestMethod(java.lang.String method) | |
| | Set the method for the URL request, one of: GET POST HEAD OPTIONS PUT DELETE TRACE are legal, subject to protocol restrictions. | |
| void | setRequestProperty(java.lang.String key, java.lang.String value) | |
| | Sets the general request property. | |
| void | setTimeout(int seconds) | |
| | Sets the value of the `timeout` field for the `HttpsURLConnection` object to the specified value. | |
| void | setUseCaches(boolean usecaches) | |
| | Sets the value of the `useCaches` field of this `URLConnection` to the specified value. | |
| java.lang.String | toString() | |
| | Returns a `String` representation of this URL connection. | |
| boolean | usingProxy() | |
| | Indicates if the connection is going through a proxy. | |

| Methods inherited from class java.net.URLConnection |
|---|
| getContent |

| Methods inherited from class java.lang.Object |
|---|
| clone, equals, finalize, getClass, hashCode, notify, notifyAll, wait, wait, wait |

Field Detail

HTTP_OK public static final int HTTP_OK

> 2XX: generally "OK"

HTTP_CREATED public static final int HTTP_CREATED

HTTP_ACCEPTED public static final int HTTP_ACCEPTED

HTTP_NOT_AUTHORITATIVE public static final int HTTP_NOT_AUTHORITATIVE

HTTP_NO_CONTENT public static final int HTTP_NO_CONTENT

HTTP_RESET public static final int HTTP_RESET

HTTP_PARTIAL public static final int HTTP_PARTIAL

HTTP_MULT_CHOICE public static final int HTTP_MULT_CHOICE

> 3XX: relocation/redirect

HTTP_MOVED_PERM

```
public static final int HTTP_MOVED_PERM
```

HTTP_MOVED_TEMP

```
public static final int HTTP_MOVED_TEMP
```

HTTP_SEE_OTHER

```
public static final int HTTP_SEE_OTHER
```

HTTP_NOT_MODIFIED

```
public static final int HTTP_NOT_MODIFIED
```

HTTP_USE_PROXY

```
public static final int HTTP_USE_PROXY
```

HTTP_BAD_REQUEST

```
public static final int HTTP_BAD_REQUEST
```
    4XX: client error

HTTP_UNAUTHORIZED

```
public static final int HTTP_UNAUTHORIZED
```

HTTP_PAYMENT_REQUIRED

```
public static final int HTTP_PAYMENT_REQUIRED
```

HTTP_FORBIDDEN

```
public static final int HTTP_FORBIDDEN
```

HTTP_NOT_FOUND

```
public static final int HTTP_NOT_FOUND
```

HTTP_BAD_METHOD

```
public static final int HTTP_BAD_METHOD
```

HTTP_NOT_ACCEPTABLE

```
public static final int HTTP_NOT_ACCEPTABLE
```

HTTP_PROXY_AUTH

```
public static final int HTTP_PROXY_AUTH
```

HTTP_CLIENT_TIMEOUT

```
public static final int HTTP_CLIENT_TIMEOUT
```

HTTP_CONFLICT

```
public static final int HTTP_CONFLICT
```

HTTP_GONE

```
public static final int HTTP_GONE
```

HTTP_LENGTH_REQUIRED

```
public static final int HTTP_LENGTH_REQUIRED
```

HTTP_PRECON_FAILED

```
public static final int HTTP_PRECON_FAILED
```

HTTP_ENTITY_TOO_LARGE public static final int HTTP_ENTITY_TOO_LARGE

HTTP_REQ_TOO_LONG public static final int HTTP_REQ_TOO_LONG

HTTP_UNSUPPORTED_TYPE public static final int HTTP_UNSUPPORTED_TYPE

HTTP_SERVER_ERROR public static final int HTTP_SERVER_ERROR

> 5XX: server error

HTTP_INTERNAL_ERROR public static final int HTTP_INTERNAL_ERROR

HTTP_BAD_GATEWAY public static final int HTTP_BAD_GATEWAY

HTTP_UNAVAILABLE public static final int HTTP_UNAVAILABLE

HTTP_GATEWAY_TIMEOUT public static final int HTTP_GATEWAY_TIMEOUT

HTTP_VERSION public static final int HTTP_VERSION

Constructor Detail

HttpsURLConnection

```
public HttpsURLConnection(java.net.URL u)
```

Creates a new HttpsURLConnection instance to the object referenced by the URL argument with the default debug flag.
Parameters:
    u - the URL that this connects to.

---

HttpsURLConnection

```
public HttpsURLConnection(java.net.URL u,
                          boolean dbg)
```

Creates a new HttpsURLConnection instance to the object referenced by the URL argument with a specified debug flag.
Parameters:
    u - the URL that this connects to.
    dbg - dbg the boolean value of turning the debug option ON/OFF.

Method Detail getInputStream

```
public java.io.InputStream getInputStream()
                                   throws java.io.IOException
```

Returns an input stream that reads from this open connection.
Overrides:
    getInputStream in class java.net.URLConnection
Returns:
    an input stream that reads from this open connection.
Throws:
    java.io.IOException - if an I/O error occurs while creating the input stream.
    UnknownServiceException - if the protocol does not support input.

--- getOutputStream

```
public java.io.OutputStream getOutputStream()
                                    throws java.io.IOException
```

Returns an output stream that writes to this connection.
Overrides:
    getOutputStream in class java.net.URLConnection
Returns:
    an output stream that writes to this connection.
Throws:
    java.io.IOException - if an I/O error occurs while creating the output stream.
    UnknownServiceException - if the protocol does not support output.

disconnect

```
public void disconnect()
```

> Close the connection to the server.
> Overrides:
> disconnect in class java.net.HttpURLConnection usingProxy

```
public boolean usingProxy()
```

> Indicates if the connection is going through a proxy.
> Overrides:
> usingProxy in class java.net.HttpURLConnection connect

```
public void connect()
            throws java.io.IOException
```

> Opens a communications link to the resource referenced by this URL, if such a connection has not already been established.
>
> If the `connect` method is called when the connection has already been opened (indicated by the `connected` field having the value `true`), the call is ignored.
>
> HttpsURLConnection objects go through two phases: first they are created, then they are connected. After being created, and before being connected, various options can be specified (e.g., doInput and UseCaches). After connecting, it is an error to try to set them. Operations that depend on being connected, like getContentLength, will implicitly perform the connection, if necessary.
>
> Overrides:
> connect in class java.net.URLConnection
> Throws:
> java.io.IOException - if an I/O error occurs while opening the connection.

setRequestMethod

```
public void setRequestMethod(java.lang.String method)
                throws java.net.ProtocolException
```

> Set the method for the URL request, one of:
> - GET
> - POST
> - HEAD

- OPTIONS
- PUT
- DELETE
- TRACE are legal, subject to protocol restrictions. The default method is GET.

Overrides:
  setRequestMethod in class java.net.HttpURLConnection

Throws:
  java.net.ProtocolException - if the method cannot be reset or if the requested method isn't valid for HTTP.

--- setRequestProperty

```
public void setRequestProperty(java.lang.String key,
                               java.lang.String value)
```

Sets the general request property.

Overrides:
  setRequestProperty in class java.net.URLConnection

Parameters:
  key - the keyword by which the request is known (e.g., "accept").
  value - the value associated with it.

--- getHeaderField

```
public java.lang.String getHeaderField(java.lang.String name)
```

Returns the name of the specified header field.

Overrides:
  getHeaderField in class java.net.URLConnection

Parameters:
  name - the name of a header field.

Returns:
  the value of the named header field, or null if there is no such field in the header.

--- getHTTPHeader

```
public java.lang.String getHTTPHeader()
```

Returns the entire of the HTTP header received from server request.

Returns:
  the value of the httpHeader field for this object.

--- getAllowUserInteraction

```
public boolean getAllowUserInteraction()
```

Returns the value of the allowUserInteraction field for this object.

--- file://H:\CLIENTS\IBM\159\com\ibm\speech\net\www\protocol\h...\HttpsURLConnection.htm 6/14/00

: Class HttpsURLConnection

Overrides:
    getAllowUserInteraction in class java.net.URLConnection
Returns:
    the value of the `allowUserInteraction` field for this object.

--- getContentEncoding

```
public java.lang.String getContentEncoding()
```

Returns the value of the `content-encoding` header field.
    Overrides:
        getContentEncoding in class java.net.URLConnection
    Returns:
        the content encoding of the resource that the URL references, or `null` if not known.

--- getContentLength

```
public int getContentLength()
```

Returns the value of the `content-length` header field.
    Overrides:
        getContentLength in class java.net.URLConnection
    Returns:
        the content length of the resource that this connection's URL references, or `-1` if the content length is not known.

--- getContentType

```
public java.lang.String getContentType()
```

Returns the value of the `content-type` header field.
    Overrides:
        getContentType in class java.net.URLConnection
    Returns:
        the content type of the resource that the URL references, or `null` if not known.

--- getDate

```
public long getDate()
```

Returns the value of the `date` header field.
    Overrides:
        getDate in class java.net.URLConnection
    Returns:
        the sending date of the resource that the URL references, or `0` if not known. The value returned is the number of milliseconds since January 1, 1970 GMT.

: Class HttpsURLConnection getDefaultAllowUserInteraction

```
public static boolean getDefaultAllowUserInteraction()
```

Returns the default value of the allowUserInteraction field.

Ths default is "sticky", being a part of the static state of all URLConnections. This flag applies to the next, and all following URLConnections that are created.

Returns:
the default value of the allowUserInteraction field.

getDefaultRequestProperty

```
public static java.lang.String getDefaultRequestProperty(java.lang.String key)
```

Returns the value of the default request property. Default request properties are set for every connection.
Returns:
the value of the default request property for the specified key.

getDefaultUseCaches

```
public boolean getDefaultUseCaches()
```

Returns the default value of a URLConnection's useCaches flag.

Ths default is "sticky", being a part of the static state of all URLConnections. This flag applies to the next, and all following URLConnections that are created.

Overrides:
getDefaultUseCaches in class java.net.URLConnection
Returns:
the default value of a URLConnection's useCaches flag.

getDoInput

```
public boolean getDoInput()
```

Returns the value of this URLConnection's doInput flag.
Overrides:
getDoInput in class java.net.URLConnection
Returns:
the value of this URLConnection's doInput flag.

getDoOutput

: Class HttpsURLConnection

```
public boolean getDoOutput()
```

Returns the value of this `URLConnection`'s `doOutput` flag.
    Overrides:
        getDoOutput in class java.net.URLConnection
    Returns:
        the value of this `URLConnection`'s `doOutput` flag.

getExpiration

```
public long getExpiration()
```

Returns the value of the `expires` header field.
    Overrides:
        getExpiration in class java.net.URLConnection
    Returns:
        the expiration date of the resource that this URL references, or 0 if not known. The value is the number of milliseconds since January 1, 1970 GMT.

getFileNameMap

```
public static java.net.FileNameMap getFileNameMap()
```

Returns the FileNameMap.
    Since:
        JDK1.2 getHeaderField

```
public java.lang.String getHeaderField(int n)
```

Returns the value for the $n^{th}$ header field. It returns `null` if there are fewer than n fields.

This method can be used in conjunction with the `getHeaderFieldKey` method to iterate through all the headers in the message.

Overrides:
        getHeaderField in class java.net.URLConnection
    Parameters:
        n - an index.
    Returns:
        the value of the $n^{th}$ header field.

getHeaderFieldDate

```
public long getHeaderFieldDate(java.lang.String name,
```

: Class HttpsURLConnection

```
                    long Default)
```

Returns the value of the named field parsed as date. The result is the number of milliseconds since January 1, 1970 GMT represented by the named field.

This form of `getHeaderField` exists because some connection types (e.g., http-ng) have pre-parsed headers. Classes for that connection type can override this method and short-circuit the parsing.

Overrides:
    getHeaderFieldDate in class java.net.URLConnection
Parameters:
    name - the name of the header field.
    Default - a default value.
Returns:
    the value of the field, parsed as a date. The value of the Default argument is returned if the field is missing or malformed.

getHeaderFieldInt

```
public int getHeaderFieldInt(java.lang.String name,
                             int Default)
```

Returns the value of the named field parsed as a number.

This form of `getHeaderField` exists because some connection types (e.g., http-ng) have pre-parsed headers. Classes for that connection type can override this method and short-circuit the parsing.

Overrides:
    getHeaderFieldInt in class java.net.URLConnection
Parameters:
    name - the name of the header field.
    Default - the default value.
Returns:
    the value of the named field, parsed as an integer. The Default value is returned if the field is missing or malformed.

getHeaderFieldKey

```
public java.lang.String getHeaderFieldKey(int n)
```

Returns the key for the $n^{th}$ header field.
Overrides:
    getHeaderFieldKey in class java.net.URLConnection
Parameters:
    n - an index.
Returns:
    the key for the $n^{th}$ header field, or null if there are fewer than n fields.

file://H:\CLIENTS\IBM\159\com\ibm\speech\net\www\protocol\h...\HttpsURLConnection.htm  6/14/00 getIfModifiedSince

```
public long getIfModifiedSince()
```

Returns the value of this object's `ifModifiedSince` field.

Overrides:
    getIfModifiedSince in class java.net.URLConnection

Returns:
    the value of this object's `ifModifiedSince` field.

--- getLastModified

```
public long getLastModified()
```

Returns the value of the `last-modified` header field. The result is the number of milliseconds since January 1, 1970 GMT.

Overrides:
    getLastModified in class java.net.URLConnection

Returns:
    the date the resource referenced by this `URLConnection` was last modified, or 0 if not known.

--- getPermission

```
public java.security.Permission getPermission()
                                       throws java.io.IOException
```

Returns a permission object representing the permission necessary to make the connection represented by this object. This method returns null if no permission is required to make the connection. By default, this method returns `java.security.AllPermission`. Subclasses should override this method and return the permission that best represents the permission required to make a a connection to the URL. For example, a `URLConnection` representing a `file:` URL would return a `java.io.FilePermission` object.

The permission returned may dependent upon the state of the connection. For example, the permission before connecting may be different from that after connecting. For example, an HTTP sever, say foo.com, may redirect the connection to a different host, say bar.com. Before connecting the permission returned by the connection will represent the permission needed to connect to foo.com, while the permission returned after connecting will be to bar.com.

Permissions are generally used for two purposes: to protect caches of objects obtained through URLConnections, and to check the right of a recipient to learn about a particular URL. In the first case, the permission should be obtained *after* the object has been obtained. For example, in an HTTP connection, this will represent the permission to connect to the host from which the data was ultimately fetched. In the second case, the permission should be obtained and tested *before* connecting.

Overrides:
    getPermission in class java.net.HttpURLConnection

Returns:

: Class HttpsURLConnection the permission object representing the permission necessary to make the connection represented by this URLConnection.
Throws:
java.io.IOException - if the computation of the permission requires network or file I/O and an exception occurs while computing it.

getRequestProperty

```
public java.lang.String getRequestProperty(java.lang.String key)
```

Returns the value of the named general request property for this connection.
Overrides:
getRequestProperty in class java.net.URLConnection
Returns:
the value of the named general request property for this connection.

getURL

```
public java.net.URL getURL()
```

Returns the value of this URLConnection's URL field.
Overrides:
getURL in class java.net.URLConnection
Returns:
the value of this URLConnection's URL field.

getUseCaches

```
public boolean getUseCaches()
```

Returns the value of this URLConnection's useCaches field.
Overrides:
getUseCaches in class java.net.URLConnection
Returns:
the value of this URLConnection's useCaches field.

guessContentTypeFromName

```
protected static java.lang.String guessContentTypeFromName(java.lang.String fname)
```

Tries to determine the content type of an object, based on the specified "file" component of a URL. This is a convenience method that can be used by subclasses that override the getContentType method.
Parameters:
fname - a filename.
Returns:
a guess as to what the content type of the object is, based upon its file name.

file://H:\CLIENTS\IBM\159\com\ibm\speech\net\www\protocol\h...\HttpsURLConnection.htm  6/14/00 guessContentTypeFromStream

```
public static java.lang.String guessContentTypeFromStream(java.io.InputStream is)
                                                  throws java.io.IOException
```

Tries to determine the type of an input stream based on the characters at the beginning of the input stream. This method can be used by subclasses that override the `getContentType` method.

Ideally, this routine would not be needed. But many `http` servers return the incorrect content type; in addition, there are many nonstandard extensions. Direct inspection of the bytes to determine the content type is often more accurate than believing the content type claimed by the `http` server.

Parameters:
    `is` - an input stream that supports marks.
Returns:
    a guess at the content type, or `null` if none can be determined.
Throws:
    java.io.IOException - if an I/O error occurs while reading the input stream.

--- setAllowUserInteraction

```
public void setAllowUserInteraction(boolean allowuserinteraction)
```

Set the value of the `allowUserInteraction` field of this `URLConnection`.
Overrides:
    setAllowUserInteraction in class java.net.URLConnection
Parameters:
    `allowuserinteraction` - the new value.

--- setContentHandlerFactory

```
public static void setContentHandlerFactory(java.net.ContentHandlerFactory fac)
```

Sets the `ContentHandlerFactory` of an application. It can be called at most once by an application.

The `ContentHandlerFactory` instance is used to construct a content handler from a content type If there is a security manager, this method first calls the security manager's `checkSetFactory` method to ensure the operation is allowed. This could result in a SecurityException.

Parameters:
    `fac` - the desired factory.
Throws:
    java.lang.Error - if the factory has already been defined.
    java.lang.SecurityException - if a security manager exists and its `checkSetFactory` method doesn't allow the operation.

setDefaultAllowUserInteraction

```
public static void setDefaultAllowUserInteraction(boolean defaultallowuserinteracti
```

Sets the default value of the `allowUserInteraction` field for all future `URLConnection` objects to the specified value.
Parameters:
    `defaultallowuserinteraction` - the new value.

setDefaultRequestProperty

```
public static void setDefaultRequestProperty(java.lang.String key,
                                             java.lang.String value)
```

Sets the default value of a general request property. When a `URLConnection` is created, it is initialized with these properties.
Parameters:
    `key` - the keyword by which the request is known (e.g., `"accept"`).
    `value` - the value associated with the key.

setDefaultUseCaches

```
public void setDefaultUseCaches(boolean defaultusecaches)
```

Sets the default value of the `useCaches` field to the specified value.
Overrides:
    setDefaultUseCaches in class java.net.URLConnection
Parameters:
    `defaultusecaches` - the new value.

setDoInput

```
public void setDoInput(boolean doinput)
```

Sets the value of the `doInput` field for this `URLConnection` to the specified value.

A URL connection can be used for input and/or output. Set the DoInput flag to true if you intend to use the URL connection for input, false if not. The default is true unless DoOutput is explicitly set to true, in which case DoInput defaults to false.

Overrides:
    setDoInput in class java.net.URLConnection
Parameters:
    `value` - the new value.

setDoOutput

```
public void setDoOutput(boolean dooutput)
```

Sets the value of the `doOutput` field for this `URLConnection` to the specified value.

A URL connection can be used for input and/or output. Set the DoOutput flag to true if you intend to use the URL connection for output, false if not. The default is false.

Overrides:
    setDoOutput in class java.net.URLConnection
Parameters:
    `value` - the new value.

--- setFileNameMap

```
public static void setFileNameMap(java.net.FileNameMap map)
```

Sets the FileNameMap.

If there is a security manager, this method first calls the security manager's `checkSetFactory` method to ensure the operation is allowed. This could result in a SecurityException.

Parameters:
    `map` - the FileNameMap to be set
Throws:
    java.lang.SecurityException - if a security manager exists and its `checkSetFactory` method doesn't allow the operation.

--- setIfModifiedSince

```
public void setIfModifiedSince(long ifmodifiedsince)
```

Sets the value of the `ifModifiedSince` field of this `URLConnection` to the specified value.
Overrides:
    setIfModifiedSince in class java.net.URLConnection
Parameters:
    `value` - the new value.

--- setUseCaches

```
public void setUseCaches(boolean usecaches)
```

Sets the value of the `useCaches` field of this `URLConnection` to the specified value.

Some protocols do caching of documents. Occasionally, it is important to be able to "tunnel through" and ignore the caches (e.g., the "reload" button in a browser). If the UseCaches flag on a connection is true, the connection is allowed to use whatever caches it can. If false, caches : Class HttpsURLConnection are to be ignored. The default value comes from DefaultUseCaches, which defaults to true.

Overrides:
    setUseCaches in class java.net.URLConnection

--- toString

```
public java.lang.String toString()
```

Returns a String representation of this URL connection.
Overrides:
    toString in class java.net.URLConnection
Returns:
    a string representation of this URLConnection.

--- getErrorStream

```
public java.io.InputStream getErrorStream()
```

Returns the error stream if the connection failed but the server sent useful data nonetheless. The typical example is when an HTTP server responds with a 404, which will cause a FileNotFoundException to be thrown in connect, but the server sent an HTML help page with suggestions as to what to do.

This method will not cause a connection to be initiated. If there the connection was not connected, or if the server did not have an error while connecting or if the server did have an error but there no error data was sent, this method will return null. This is the default.

Overrides:
    getErrorStream in class java.net.HttpURLConnection
Returns:
    an error stream if any, null if there have been no errors, the connection is not connected or the server sent no useful data.

--- getFollowRedirects

```
public static boolean getFollowRedirects()
```

--- getRequestMethod

```
public java.lang.String getRequestMethod()
```

Get the request method.
Overrides:
    getRequestMethod in class java.net.HttpURLConnection getResponseCode

```
public int getResponseCode()
                   throws java.io.IOException
```

Gets HTTP response status. From responses like:

```
HTTP/1.0 200 OK
HTTP/1.0 401 Unauthorized
```

Extracts the ints 200 and 401 respectively. Returns -1 if none can be discerned from the response (i.e., the response is not valid HTTP).
Overrides:
getResponseCode in class java.net.HttpURLConnection
Throws:
java.io.IOException - if an error occurred connecting to the server.

--- getResponseMessage

```
public java.lang.String getResponseMessage()
                                   throws java.io.IOException
```

Gets the HTTP response message, if any, returned along with the response code from a server. From responses like:

```
HTTP/1.0 200 OK
HTTP/1.0 404 Not Found
```

Extracts the Strings "OK" and "Not Found" respectively. Returns null if none could be discerned from the responses (the result was not valid HTTP).
Overrides:
getResponseMessage in class java.net.HttpURLConnection
Throws:
java.io.IOException - if an error occurred connecting to the server.

--- setFollowRedirects

```
public static void setFollowRedirects(boolean set)
```

Sets whether HTTP redirects (requests with response code 3xx) should be automatically followed by this class. True by default. Applets cannot change this variable.

If there is a security manager, this method first calls the security manager's `checkSetFactory` method to ensure the operation is allowed. This could result in a SecurityException.

Throws:
java.lang.SecurityException - if a security manager exists and its `checkSetFactory` method doesn't allow the operation.

setKeyRingDatabase

```
public void setKeyRingDatabase(java.lang.String name)
```

>Sets the value of the `keyRingDatabase` field for the `HttpsURLConnection` object to the specified value. SSL specific API extension.
>Parameters:
>>name - the new value.

setTimeout

```
public void setTimeout(int seconds)
```

>Sets the value of the `timeout` field for the `HttpsURLConnection` object to the specified value. SSL specific API extension.
>Parameters:
>>seconds - the new value.

setAsynConnections

```
public void setAsynConnections(boolean value)
```

>Sets the value of the `asyncConnectionSet` field for the `HttpsURLConnection` object to the specified value. SSL specific API extension.
>Parameters:
>>value - the new value.

setEnabledCompressionMethods

```
public void setEnabledCompressionMethods(java.lang.String methods)
```

>Sets the value of the `enabledCompressionMethods` field for the `HttpsURLConnection` object to the specified value. SSL specific API extension.
>Parameters:
>>methods - the new value.

setEnableCipherSuites

```
public void setEnableCipherSuites(java.lang.String cipherSuites)
```

>Sets the value of the `enabledCipherSuites` field for the `HttpsURLConnection` object to the specified value. SSL specific API extension.
>Parameters:
>>cipherSuites - the new value.

Class Tree Deprecated Index Help

PREV CLASS NEXT CLASS                          FRAMES NO FRAMES
SUMMARY: INNER | FIELD | CONSTR | METHOD           DETAIL: FIELD | CONSTR | METHOD 6169-159

APPENDIX C

Class HttpsClient

Class Tree Deprecated Index Help
PREV CLASS  NEXT CLASS
SUMMARY: INNER | FIELD | CONSTR | METHOD

FRAMES  NO FRAMES
DETAIL: FIELD | CONSTR | METHOD com.ibm.speech.net.www.protocol.https
Class HttpsClient

```
java.lang.Object
  |
  +--com.ibm.sslight.SSLContext
        |
        +--com.ibm.speech.net.www.protocol.https.HttpsClient
``` public class HttpsClient
extends com.ibm.sslight.SSLContext

| Inner classes inherited from class com.ibm.sslight.SSLContext |
|---|
| com.ibm.sslight.SSLContext.KeyConstraints |

Field Summary

| | |
|---:|:---|
| static int | CONNECTED<br>Connection established. |
| static java.lang.String | defaultKeyRingDatabase<br>Default key ring database. |
| static int | defaultPort<br>Default port allocated for HTTPS provided by HTTP RFC. |
| static int | NOT_CONNECTED<br>Connection not established. |
| static java.lang.String | sslCertIssuerName<br>Certificate Issuer Name of SSL established connection. |
| static java.lang.String | sslCertOrgName<br>Certificate's Organization Name of SSL established connection. |
| static java.lang.String | sslCipherSuite<br>Cipher suite of SSL established connection. |
| static java.lang.String | sslCompressMethod<br>Compression method of SSL established connection. |
| static java.net.InetAddress | sslInetAddress<br>java.net.InetAddress of SSL established connection. |
| static int | sslPort<br>Port of SSL established connection. |

: Class HttpsClient

| Fields inherited from class com.ibm.sslight.SSLContext |
|---|
| asyncConnections, CA, clientAuthentication, CONNECT, CONNECTION, debug, SESSION, SITE |

Constructor Summary

| | |
|---|---|
| HttpsClient(java.net.URL u)<br>          Creates a new `HttpsClient` instance with the default debug flag. | |
| HttpsClient(java.net.URL u, boolean debug)<br>          Creates a new `HttpsURLStreamHandler` instance with a specified debug flag. | |

Method Summary

| | |
|---|---|
| void | connect()<br>          Method that calls that sets up SSL connection. |
| void | connect(java.lang.String host, int port)<br>          Method that established SSL connection. |
| void | disconnect()<br>          Close the connection to the server. |
| java.lang.String | getHTTPHeader()<br>          Returns the header from the HTTP request. |
| java.io.InputStream | getInputStream()<br>          Returns a input stream that reads from this open connection. |
| java.io.OutputStream | getOutputStream()<br>          Returns a java.net.OutputStream that writes to this connection. |
| int | getState()<br>          Returns the current state of the connection. |
| protected boolean | handleCertificateChain(com.ibm.sslight.SSLCert[] chain)<br>          This method is called by SSL if a certificate chain has to be validated by the SSL protocol but that cannot be done based on the information stored in the public key ring associated with the context or there is no public key ring defined at all. |
| void | setAsynConnections(boolean value)<br>          Sets the value of the `asyncConnectionSet` field for the `HttpsClient` object to the specified value. |
| void | setEnableCipherSuites(java.lang.String cipherSuites)<br>          Sets the value of the `enabledCipherSuites` field for the `HttpsURLConnection` object to the specified value. |
| void | setEnabledCompressionMethods(java.lang.String methods)<br>          Sets the value of the `enabledCompressionMethods` field for the `HttpsClient` object to the specified value. |
| void | setKeyRingDatabase(java.lang.String name)<br>          Sets the value of the `keyRingDatabase` field for the `HttpsClient` object to the specified value. |
| void | setRequestMethod(java.lang.String method)<br>          Sets the value of the `method` field for the `HttpsClient` object to the specified value. |

| | |
|---|---|
| void | setRequestProperties(java.lang.String properties)<br>Sets the value of the `requestProperties` field for the `HttpsClient` object to the specified value. |
| void | setTimeout(int seconds)<br>Sets the value of the `timeout` field for the `HttpsURLConnection` object to the specified value. |

| Methods inherited from class com.ibm.sslight.SSLContext |
|---|
| allowStepUpCryptography, clone, confirmCertificateChain, confirmKeySelection, exportKeyRings, getEnabledCipherSuites, getEnabledCompressionMethods, getKeyRing, getSSLCertByLabel, getTimeout, handleCertificateChain, handleConnection, handleNoPeerCertificate, handleNoSiteCertificate, importCACertificates, importKeyRings, importKeyRings, importSiteCertificates, queryAcceptableKeys, restrictStepUpCryptography, setEnabledCipherSuites, setKeyRing, setTimeout |

| Methods inherited from class java.lang.Object |
|---|
| equals, finalize, getClass, hashCode, notify, notifyAll, toString, wait, wait, wait |

Field Detail sslPort

```
public static int sslPort
```

Port of SSL established connection.

sslInetAddress

```
public static java.net.InetAddress sslInetAddress
``` java.net.InetAddress of SSL established connection.

sslCompressMethod

```
public static java.lang.String sslCompressMethod
```

Compression method of SSL established connection.

sslCipherSuite

```
public static java.lang.String sslCipherSuite
```

Cipher suite of SSL established connection.

sslCertOrgName

```
public static java.lang.String sslCertOrgName
```

Certificate's Organization Name of SSL established connection.

sslCertIssuerName

```
public static java.lang.String sslCertIssuerName
```

Certificate Issuer Name of SSL established connection.

NOT_CONNECTED

```
public static final int NOT_CONNECTED
```

Connection not established.

CONNECTED

```
public static final int CONNECTED
```

Connection established.

defaultPort

```
public static final int defaultPort
```

Default port allocated for HTTPS provided by HTTP RFC.

defaultKeyRingDatabase

```
public static final java.lang.String defaultKeyRingDatabase
```

Default key ring database.

Constructor Detail

HttpsClient

```
public HttpsClient(java.net.URL u)
```

Creates a new `HttpsClient` instance with the default debug flag.
Parameters:
    u - the java.net.URL associated with the connection.

---

HttpsClient

```
public HttpsClient(java.net.URL u,
                   boolean debug)
```

Creates a new `HttpsURLStreamHandler` instance with a specified debug flag.
Parameters:
    u - the java.net.URL associated with the connection.
    dbg - the boolean value of turning the debug option ON/OFF.

Method Detail handleCertificateChain

```
protected boolean handleCertificateChain(com.ibm.sslight.SSLCert[] chain)
```

This method is called by SSL if a certificate chain has to be validated by the SSL protocol but that cannot be done based on the information stored in the public key ring associated with the context or there is no public key ring defined at all. It can be overridden in a subclass of SSLContext If not redefined, this method returns false, which means the certificate chain is not verified. In that case the connection establishment is aborted.
Parameters:
    chain - the `SSLCert[]` assoiciated with the connection. x509chain - the chain of X509.v3 certificates, ordered with the sender's certificate first an the root certificate authority last. correlator - used by the application to associate the handshake with some application defiend Object. This is the same correlator that was used on the SSLSocket constructor or the "accept" for the SSLServerSocket, depending on whether the current role is client or server.

--- getInputStream

```
public java.io.InputStream getInputStream()
                                   throws java.io.IOException
```

Returns a input stream that reads from this open connection.
Returns:
    an java.io.InputStream that reads from this open connection.
Throws:
    java.io.IOException - if an I/O error occurs while creating the input stream.

--- getOutputStream

```
public java.io.OutputStream getOutputStream()
                                     throws java.io.IOException
```

: Class HttpsClient

Returns a java.net.OutputStream that writes to this connection.
Returns:
    an output stream that writes to this connection.
Throws:
    java.io.IOException - if an I/O error occurs while creating the output stream.

--- connect

```
public void connect()
```

Method that calls that sets up SSL connection.

--- connect

```
public void connect(java.lang.String host,
                    int port)
             throws java.io.IOException
```

Method that established SSL connection.
Parameters:
    host - the host to request a connection from.
    port - the port the requested server is listening on.
Throws:
    IOExeption - if an error occurs while establishing the connection.

--- disconnect

```
public void disconnect()
```

Close the connection to the server.

--- getState

```
public int getState()
```

Returns the current state of the connection.
Returns:
    int the state of the connection 1 if connected, 0 otherwise.

--- getHTTPHeader

```
public java.lang.String getHTTPHeader()
```

Returns the header from the HTTP request.
Returns:

: Class HttpsClient

String the header stripped from the connection's java.net.InputStream.

setRequestMethod

```
public void setRequestMethod(java.lang.String method)
```

Sets the value of the `method` field for the `HttpsClient` object to the specified value.
Parameters:
name - the new value.

setRequestProperties

```
public void setRequestProperties(java.lang.String properties)
```

Sets the value of the `requestProperties` field for the `HttpsClient` object to the specified value.
Parameters:
name - the new value.

setKeyRingDatabase

```
public void setKeyRingDatabase(java.lang.String name)
```

Sets the value of the `keyRingDatabase` field for the `HttpsClient` object to the specified value.
Parameters:
name - the new value.

setTimeout

```
public void setTimeout(int seconds)
```

Sets the value of the `timeout` field for the `HttpsURLConnection` object to the specified value.
Parameters:
seconds - the new value.

setAsynConnections

```
public void setAsynConnections(boolean value)
```

Sets the value of the `asyncConnectionSet` field for the `HttpsClient` object to the specified value.
Parameters:
value - the new value.

file://H:\CLIENTS\IBM\159\com\ibm\speech\net\www\protocol\https\HttpsClient.html    6/14/00 setEnabledCompressionMethods

```
public void setEnabledCompressionMethods(java.lang.String methods)
```

> Sets the value of the `enabledCompressionMethods` field for the `HttpsClient` object to the specified value.
> Overrides:
> > setEnabledCompressionMethods in class com.ibm.sslight.SSLContext
>
> Parameters:
> > `methods` - the new value.

--- setEnableCipherSuites

```
public void setEnableCipherSuites(java.lang.String cipherSuites)
```

> Sets the value of the `enabledCipherSuites` field for the `HttpsURLConnection` object to the specified value.
> Parameters:
> > `cipherSuites` - the new value.

---

Class Tree Deprecated Index Help

PREV CLASS NEXT CLASS      FRAMES  NO FRAMES
SUMMARY: INNER | FIELD | CONSTR | METHOD      DETAIL: FIELD | CONSTR | METHOD

APPENDIX D

Class HttpsURLStreamHandlerFactory

Class Tree Deprecated Index Help
PREV CLASS NEXT CLASS
SUMMARY: INNER | FIELD | CONSTR | METHOD
FRAMES NO FRAMES
DETAIL: FIELD | CONSTR | METHOD com.ibm.speech.net.www.protocol.https
Class HttpsURLStreamHandlerFactory

```
java.lang.Object
  |
  +--com.ibm.speech.net.www.protocol.https.HttpsURLStreamHandlerFactory
```

--- public class HttpsURLStreamHandlerFactory
extends java.lang.Object
implements java.net.URLStreamHandlerFactory This class implements a factory interface for URL stream protocol handlers.

It is used by the URL class to create a HttpsURLStreamHandler for the https protocol.

---

Constructor Summary

| |
|---|
| HttpsURLStreamHandlerFactory() |

Method Summary

| | |
|---|---|
| java.net.URLStreamHandler | createURLStreamHandler(java.lang.String protocol)<br>Creates a new HttpsURLStreamHandler instance with the specified https protocol. |

Methods inherited from class java.lang.Object

| |
|---|
| clone, equals, finalize, getClass, hashCode, notify, notifyAll, toString, wait, wait, wait |

---

Constructor Detail

HttpsURLStreamHandlerFactory public HttpsURLStreamHandlerFactory()

Method Detail createURLStreamHandler

```
public java.net.URLStreamHandler createURLStreamHandler(java.lang.String protocol)
```

Creates a new `HttpsURLStreamHandler` instance with the specified `https` protocol.

Specified by:
createURLStreamHandler in interface java.net.URLStreamHandlerFactory

Parameters:
`protocol` - the protocol `https`.

Returns:
a `HttpsURLStreamHandler` for the specific protocol.

APPENDIX E

Class HttpsURLStreamHandler

Class Tree Deprecated Index Help
PREV CLASS  NEXT CLASS                                       FRAMES  NO FRAMES
SUMMARY: INNER | FIELD | CONSTR | METHOD                     DETAIL: FIELD | CONSTR | METHOD com.ibm.speech.net.www.protocol.https
Class HttpsURLStreamHandler

```
java.lang.Object
   |
   +--java.net.URLStreamHandler
         |
         +--com.ibm.speech.net.www.protocol.https.HttpsURLStreamHandler
```

--- public class HttpsURLStreamHandler
extends java.net.URLStreamHandler

The class `HttpsURLStreamHandler` provides a stream protocol handler for the `https` protocol by implementing SSL (Secure Sockets Layer) 3.0.

In most cases, an instance of a `HttpsURLStreamHandler` subclass is not created directly by an application. Rather, the first time a protocol name is encountered when constructing a URL, the appropriate stream protocol handler is automatically loaded.

---

Constructor Summary

| |
|---|
| `HttpsURLStreamHandler()`<br>    Creates a new `HttpsURLStreamHandler` instance with the default debug flag. |
| `HttpsURLStreamHandler(boolean dbg)`<br>    Creates a new `HttpsURLStreamHandler` instance with a specified debug flag. |

Method Summary

| | |
|---|---|
| `java.net.URLConnection` | `openConnection(java.net.URL u)`<br>    Opens a connection to the object referenced by the URL argument. |

| Methods inherited from class java.net.URLStreamHandler |
|---|
| `parseURL, setURL, toExternalForm` |

| Methods inherited from class java.lang.Object |
|---|
| `clone, equals, finalize, getClass, hashCode, notify, notifyAll, toString, wait, wait, wait` |

---

Constructor Detail

HttpsURLStreamHandler

```
public HttpsURLStreamHandler()
```

Creates a new `HttpsURLStreamHandler` instance with the default debug flag.

---

HttpsURLStreamHandler

```
public HttpsURLStreamHandler(boolean dbg)
```

Creates a new `HttpsURLStreamHandler` instance with a specified debug flag.
Parameters:
   dbg - the boolean value of turning the debug option ON/OFF.

Method Detail openConnection

```
public java.net.URLConnection openConnection(java.net.URL u)
                                      throws java.io.IOException
```

Opens a connection to the object referenced by the URL argument.
Overrides:
   openConnection in class java.net.URLStreamHandler
Parameters:
   u - the URL that this connects to.
Returns:
   a `HttpsURLConnection` object for the URL.
Throws:
   java.io.IOException - if an I/O error occurs while opening the connection.

The SSL Protocol

Version 3.0

Internet Draft

March 1996 (Expires 9/96)

Alan O. Freier, Netscape Communications
Philip Karlton, Netscape Communications
Paul C. Kocher, Independent Consultant

Table of Contents

1. Status of this memo

2. Abstract

3. Introduction

4. Goals

5. Goals of this document

6. Presentation language 6.1 Basic block size
    6.2 Miscellaneous
    6.3 Vectors
    6.4 Numbers
    6.5 Enumerateds
    6.6 Constructed types
        6.6.1 Variants
    6.7 Cryptographic attributes
    6.8 Constants 7. SSL protocol 7.1 Session and connection states
    7.2 Record layer
        7.2.1 Fragmentation
        7.2.2 Record compression and decompression
        7.2.3 Record payload protection and the CipherSpec
    7.3 Change cipher spec protocol
    7.4 Alert protocol
        7.4.1 Closure alerts
        7.4.2 Error alerts
    7.5 Handshake protocol overview
    7.6 Handshake protocol
        7.6.1 Hello messages
        7.6.2 Server certificate
        7.6.3 Server key exchange message
        7.6.4 Certificate request
        7.6.5 Server hello done
        7.6.6 Client certificate
        7.6.7 Client key exchange message
        7.6.8 Certificate verify
        7.6.9 Finished
    7.7 Application data protocol 8. Cryptographic computations 8.1 Asymmetric cryptographic computations
    8.1.1 RSA
    8.1.2 Diffie-Hellman
    8.1.3 Fortezza
8.2 Symmetric cryptographic calculations and the CipherSpec
    8.2.1 The master secret
    8.2.2 Converting the master secret into keys and MAC secrets

Appendices

A. Protocol constant values

A.1 Reserved port assignments
    A.1.1 Record layer
A.2 Change cipher specs message
A.3 Alert messages
A.4 Handshake protocol
    A.4.1 Hello messages
    A.4.2 Server authentication and key exchange messages
A.5 Client authentication and key exchange messages
    A.5.1 Handshake finalization message
A.6 The CipherSuite
A.7 The CipherSpec

B. Glossary

C. CipherSuite definitions

D. Implementation Notes

D.1 Temporary RSA keys
D.2 Random Number Generation and Seeding
D.3 Certificates and authentication
D.4 CipherSuites

E. Version 2.0 Backward Compatibility

E.1 Version 2 client hello
E.2 Avoiding man-in-the-middle version rollback

F. Security analysis

F.1 Handshake protocol
    F.1.1 Authentication and key exchange
    F.1.2 Version rollback attacks
    F.1.3 Detecting attacks against the handshake protocol
    F.1.4 Resuming sessions
    F.1.5 MD5 and SHA
F.2 Protecting application data
F.3 Final notes

G. Patent Statement

References

Authors

Other contributors

Early reviewers

*SSL Version 3.0 - March 1996*

SSL 3.0 Specification

1. Status of this memo

This document is an Internet-Draft. Internet-Drafts are working documents of the Internet Engineering Task Force (IETF), its areas, and its working groups. Note that other groups may also distribute working documents as Internet-Drafts.

Internet-Drafts are draft documents valid for a maximum of six months and may be updated, replaced, or made obsolete by other documents at any time. It is inappropriate to use Internet-Drafts as reference material or to cite them other than as *work in progress*.

To learn the current status of any Internet-Draft, please check the *1id-abstracts.txt* listing contained in the Internet Drafts Shadow Directories on ds.internic.net (US East Coast), nic.nordu.net (Europe), ftp.isi.edu (US West Coast), or munnari.oz.au (Pacific Rim).

2. Abstract

This document specifies Version 3.0 of the Secure Sockets Layer (SSL V3.0) protocol, a security protocol that provides communications privacy over the Internet. The protocol allows client/server applications to communicate in a way that is designed to prevent eavesdropping, tampering, or message forgery.

3. Introduction

The primary goal of the SSL Protocol is to provide privacy and reliability between two communicating applications. The protocol is composed of two layers. At the lowest level, layered on top of some reliable transport protocol (e.g., TCP[TCP]), is the SSL Record Protocol. The SSL Record Protocol is used for encapsulation of various higher level protocols. One such encapsulated protocol, the SSL Handshake Protocol, allows the server and client to authenticate each other and to negotiate an encryption algorithm and cryptographic keys before the application protocol transmits or receives its first byte of data. One advantage of SSL is that it is application protocol independent. A higher level protocol can layer on top of the SSL Protocol transparently.

The SSL protocol provides *connection security* that has three basic properties:

o The connection is private. Encryption is used after an initial handshake to define a secret key. Symmetric cryptography is used for data encryption (e.g., DES[DES], RC4[RC4], etc.)
   o The peer's identity can be authenticated using asymmetric, or public key, cryptography (e.g., RSA[RSA], DSS[DSS], etc.).
   o The connection is reliable. Message transport includes a message integrity check using a keyed MAC. Secure hash functions (e.g., SHA, MD5, etc.) are used for MAC computations.

4. Goals

The goals of SSL Protocol v3.0, in order of their priority, are:

1. Cryptographic security
   SSL should be used to establish a secure connection between two parties.
   2. Interoperability
   Independent programmers should be able to develop applications utilizing SSL 3.0 that will then be able to successfully exchange cryptographic parameters without knowledge of one another's code.

Note: It is not the case that all instances of SSL (even in the same application domain) will be able to successfully connect. For instance, if the server supports a particular hardware token, and the client does not have access to such a token, then the connection will not succeed.

3. Extensibility
   SSL seeks to provide a framework into which new public key and bulk encryption methods can be incorporated as necessary. This will also accomplish two sub-goals: to prevent the need to create a new protocol (and risking the introduction of possible new weaknesses) and to avoid the need to implement an entire new security library.
   4. Relative efficiency
   Cryptographic operations tend to be highly CPU intensive, particularly public key operations. For this reason, the SSL protocol has incorporated an optional session caching scheme to reduce the number of connections that need to be established from scratch. Additionally, care has been taken to reduce network activity.

SSL 3.0 Specification

5. Goals of this document

The SSL Protocol Version 3.0 Specification is intended primarily for readers who will be implementing the protocol and those doing cryptographic analysis of it. The spec has been written with this in mind, and it is intended to reflect the needs of those two groups. For that reason, many of the algorithm-dependent data structures and rules are included in the body of the text (as opposed to in an Appendix), providing easier access to them.

This document is not intended to supply any details of service definition nor interface definition, although it does cover select areas of policy as they are required for the maintenance of solid security.

6. Presentation language

This document deals with the formatting of data in an external representation. The following very basic and somewhat casually defined presentation syntax will be used. The syntax draws from several sources in its structure. Although it resembles the programming language 'C' in its syntax and XDR [XDR] in both its syntax and intent, it would be risky to draw too many parallels. The purpose of this presentation language is to document SSL only, not to have general application beyond that particular goal.

6.1 Basic block size

The representation of all data items is explicitly specified. The basic data block size is one byte (i.e. 8 bits). Multiple byte data items are concatenations of bytes, from left to right, from top to bottom. From the bytestream a multi-byte item (a numeric in the example) is formed (using C notation) by:

```
value = (byte[0] << 8*(n-1)) | (byte[1] << 8*(n-2)) | ... | byte[n-1];
```

This byte ordering for multi-byte values is the commonplace network byte order or big endian format.

6.2 Miscellaneous

Comments begin with "/*" and end with "*/".

Optional components are denoted by enclosing them in italic "*[ ]*" brackets.

Single byte entities containing uninterpreted data are of type opaque.

6.3 Vectors

A vector (single dimensioned array) is a stream of homogeneous data elements. The size of the vector may be specified at documentation time or left unspecified until runtime. In either case the length declares the number of bytes, not the number of elements, in the vector.

The syntax for specifying a new type $T'$ that is a fixed length vector of type $T$ is

```
T T'[n];
```

Here $T'$ occupies $n$ bytes in the data stream, where $n$ is a multiple of the size of $T$. The length of the vector is not included in the encoded stream.

In the following example, Datum is defined to be three consecutive bytes that the protocol does not interpret, while Data is three consecutive Datum, consuming a total of nine bytes.

```
opaque Datum[3];   /* three uninterpreted bytes of data */
Datum Data[9];     /* 3 consecutive 3 byte vectors */
```

Variable length vectors are defined by specifying a subrange of legal lengths, inclusively, using the notation <floor..ceiling>. When encoded, the *actual length* precedes the vector's contents in the byte stream. The length will be in the form of a number consuming as many bytes as required to hold the vector's specified maximum (*ceiling*) length. A variable length vector with an actual length field of zero is referred to as an empty vector.

```
T T'<floor..ceiling>;
```

In the following example, mandatory is a vector that must contain between 300 and 400 bytes of type opaque. It can never be empty. The *actual length* field consumes two bytes, a uint16, sufficient to represent the value 400 (see Section 6.4). On the other hand, longer can represent up to 800 bytes of data, or 400 uint16 elements, and it may be empty. Its encoding will include a two byte *actual length* field prepended to the vector.

```
opaque mandatory<300..400>;  /* length field is 2 bytes, cannot be empty */
uint16 longer<0..800>;       /* zero to 400 16-bit unsigned integers */
```

6.4 Numbers

The basic numeric data type is an unsigned byte (uint8). All larger numeric data types are formed from fixed length series of bytes concatenated as described in Section 6.1 and are also unsigned. The following numeric types are predefined.

```
uint8 uint16[2];
uint8 uint24[3];
uint8 uint32[4];
uint8 uint64[8];
```

6.5 Enumerateds

An additional sparse data type is available called enum. A field of type enum can only assume the values declared in the definition. Each definition is a different type. Only enumerateds of the same type may be assigned or compared. Every element of an enumerated must be assigned a value, as demonstrated in the following example. Since the elements of the enumerated are not *ordered*, they can be assigned any unique value, in any order.

```
enum { e_1(v_1), e_2 (v_1), ... , e_n (v_N), [(n)] } T_e;
```

Enumerateds occupy as much space in the byte stream as would its maximal defined ordinal value. The following definition would cause one byte to be used to carry fields of type Color.

```
enum { red(3), blue(5), white(7) } Color;
```

One may optionally specify a value without its associated tag to force the width definition without defining a superfluous element. In the following example, Taste will consume two bytes in the data stream but can only assume the values 1, 2 or 4.

```
enum { sweet(1), sour(2), bitter(4), (32000) } Taste;
```

The names of the elements of an enumeration are scoped within the defined type. In the first example, a fully qualified reference to the second element of the enumeration would be Color.blue. Such qualification is not required if the target of the assignment is well specified.

```
Color color = Color.blue;    /* overspecified, but legal */
Color color = blue;          /* correct, type is implicit */
```

For enumerateds that are never converted to external representation, the numerical information may be omitted.

```
enum { low, medium, high } Amount;
```

6.6 Constructed types

Structure types may be constructed from primitive types for convenience. Each specification declares a new, unique type. The syntax for definition is much like that of C.

```
struct {
        T_1  f_1;
        T_2  f_2;
        ...
        T_n  f_n;
} [T];
```

The fields within a structure may be qualified using the type's name using a syntax much like that available for enumerateds. For example, $T.f_2$ refers to the second field of the previous declaration. Structure definitions may be embedded.

6.6.1 Variants

Defined structures may have *variants* based on some knowledge that is available within the environment. The selector must be an enumerated type that defines the possible variants the structure defines. There must be a case arm for every element of the enumeration declared in the select. The body of the variant structure may be given a label for reference. The mechanism by which the variant is selected at runtime is not prescribed by the presentation language.

```
struct {
        T1 f1;
        T2 f2;
        ....
        Tn fn;
        select (E) {
            case e1: Te1;
            case e2: Te2;
            ....
            case en: Ten;
        } [fv];
} [Tv];
```

For example

```
enum { apple, orange } VariantTag;
struct {
        uint16 number;
        opaque string<0..10<;    /* variable length */
} V1;
struct {
        uint32 number;
        opaque string[10];       /* fixed length */
} V2;
struct {
        select (VariantTag) {    /* value of variant selector is implicit */
            case apple: V1;      /* definition of VariantBody, tag = apple */
            case orange: V2;     /* definition of VariantBody, tag = orange */
        } variant_body;          /* optional label on the variant portion */
} VariantRecord;
```

Variant structures may be qualified (narrowed) by specifying a value for the selector prior to the type. For example, a

```
orange VariantRecord
``` is a *narrowed* type of a VariantRecord containing a variant_body of type V2.

6.7 Cryptographic attributes

The four cryptographic operations *digital signing, stream cipher encryption, block cipher encryption,* and *public key encryption* are designated digitally-signed, stream-ciphered, block-ciphered, and public-key-encrypted, respectively. A field's cryptographic processing is specified by prepending an appropriate key word designation before the field's type specification. Cryptographic keys are implied by the *current session state* (see Section 7.1).

In digital signing, one-way hash functions are used as input for a signing algorithm. In RSA signing, a 36-byte structure of two hashes (one SHA and one MD5) is *signed* (encrypted with the private key). In DSS, the 20 bytes of the SHA hash are run directly through the Digital Signing Algorithm with no additional hashing.

In stream cipher encryption, the plaintext is exclusive-ORed with an identical amount of output generated from a cryptographically-secure keyed pseudorandom number generator.

In block cipher encryption, every block of plaintext encrypts to a block of ciphertext. Because it is unlikely that the plaintext (whatever data is to be sent) will break neatly into the necessary block size (usually 64 bits), it is necessary to pad out the end of short blocks with some regular pattern, usually all zeroes.

In public key encryption, one-way functions with secret "trapdoors" are used to encrypt the outgoing data. Data encrypted with the public key of a given key pair can only be decrypted with the private key, and vice-versa.

In the following example:

```
stream-ciphered struct {
        uint8 field1;
        uint8 field2;
        digitally-signed opaque hash[20];
} UserType;
```

The contents of hash are used as input for a signing algorithm, then the entire structure is encrypted with a stream cipher.

6.8 Constants

Typed constants can be defined for purposes of specification by declaring a symbol of the desired type and assigning values to it. Under-specified types (opaque, variable length vectors, and structures that contain opaque) cannot be assigned values. No fields of a multi-element structure or vector may be elided.

For example,

```
struct {
        uint8 f1;
        uint8 f2;
} Example1;
Example1 ex1 = {1, 4};   /* assigns f1 = 1, f2 = 4 */
```

7. SSL protocol

SSL is a layered protocol. At each layer, messages may include fields for length, description, and content. SSL takes messages to be transmitted, fragments the data into manageable blocks, optionally compresses the data, applies a MAC, encrypts, and transmits the result. Received data is decrypted, verified, decompressed, and reassembled, then delivered to higher level clients.

7.1 Session and connection states

An SSL session is *stateful*. It is the responsibility of the SSL Handshake protocol to coordinate the states of the client and server, thereby allowing the protocol state machines of each to operate consistently, despite the fact that the state is not exactly parallel. Logically the state is represented twice, once as the current *operating* state, and (during the handshake protocol) again as the *pending* state. Additionally, separate read and write states are maintained. When the client or server receives a change cipher spec message, it copies the pending read state into the current read state. When the client or server sends a change cipher spec message, it copies the pending write state into the current write state. When the handshake negotiation is complete, the client and server exchange change cipher spec messages (see Section 7.3), and then communicate using the newly agreed-upon cipher spec.

An SSL session may include multiple secure connections; in addition, parties may have multiple simultaneous sessions.

The session state includes the following elements:

session identifier
    An arbitrary byte sequence chosen by the server to identify an active or resumable session state
peer certificate
    X509.v3[X509] certificate of the peer. This element of the state may be null.
compression method
    The algorithm used to compress data prior to encryption.
cipher spec
    Specifies the bulk data encryption algorithm (such as null, DES, etc.) and a MAC algorithm (such as MD5 or SHA). It also defines cryptographic attributes such as the hash_size. (See Appendix A.7 for formal definition.)
master secret
    48-byte secret shared between the client and server.
is resumable
    A flag indicating whether the session can be used to initiate new connections.

The connection state includes the following elements:

server and client random
Byte sequences that are chosen by the server and client for each connection.
server write MAC secret
The secret used in MAC operations on data written by the server.
client write MAC secret
The secret used in MAC operations on data written by the client.
server write key
The bulk cipher key for data encrypted by the server and decrypted by the client.
client write key
The bulk cipher key for data encrypted by the client and decrypted by the server.
initialization vectors
When a block cipher in CBC mode is used, an initialization vector (IV) is maintained for each key. This field is first initialized by the SSL handshake protocol. Thereafter the final ciphertext block from each record is preserved for use with the following record.
sequence numbers
Each party maintains separate sequence numbers for transmitted and received messages for each connection. When a party sends or receives a change cipher spec message, the appropriate sequence number is set to zero. Sequence numbers are of type uint64 and may not exceed $2^{64}$-1.

7.2 Record layer

The SSL Record Layer receives uninterpreted data from higher layers in non-empty blocks of arbitrary size.

7.2.1 Fragmentation

The record layer fragments information blocks into SSLPlaintext records of $2^{14}$ bytes or less. Client message boundaries are not preserved in the record layer (i.e., multiple client messages of the same ContentType may be coalesced into a single SSLPlaintext record).

```
struct {
        uint8 major, minor;
} ProtocolVersion;
enum {
        change_cipher_spec(20), alert(21), handshake(22),
        application_data(23), (255)
} ContentType;
struct {
        ContentType type;
        ProtocolVersion version;
        uint16 length;
        opaque fragment[SSLPlaintext.length];
} SSLPlaintext;
``` type
The higher level protocol used to process the enclosed fragment.
version
The version of protocol being employed. This document describes SSL Version 3.0 (See Appendix A.1.1).
length
The length (in bytes) of the following SSLPlaintext fragment. The length should not exceed $2^{14}$.
fragment
The application data. This data is transparent and treated as an independent block to be dealt with by the higher level protocol specified by the type field.

Note: Data of different SSL Record layer content types may be interleaved. Application data is generally of lower precedence for transmission than other content types.

7.2.2 Record compression and decompression

All records are compressed using the compression algorithm defined in the current session state. There is always an active compression algorithm, however initially it is defined as CompressionMethod.null. The compression algorithm translates an SSLPlaintext structure into an SSLCompressed structure. Compression functions erase their state information whenever the CipherSpec is replaced.

Note: The CipherSpec is part of the session state described in Section 7.1. References to fields of the CipherSpec are made throughout this document using presentation syntax. A more complete description of the CipherSpec is shown in Appendix

A.7.

Compression must be lossless and may not increase the content length by more than 1024 bytes. If the decompression function encounters an SSLCompressed.fragment that would decompress to a length in excess of $2^{14}$ bytes, it should issue a fatal decompression_failure alert (Section 7.4.2).

```
struct {
        ContentType type;             /* same as SSLPlaintext.type */
        ProtocolVersion version;      /* same as SSLPlaintext.version */
        uint16 length;
        opaque fragment[SSLCompressed.length];
} SSLCompressed;
``` length
   The length (in bytes) of the following SSLCompressed.fragment. The length should not exceed $2^{14}$ + 1024.
fragment
   The compressed form of SSLPlaintext.fragment.

Note: A CompressionMethod.null operation is an identity operation; no fields are altered. (See Appendix A.4.1)

Implementation note: Decompression functions are responsible for ensuring that messages cannot cause internal buffer overflows.

7.2.3 Record payload protection and the CipherSpec

All records are protected using the encryption and MAC algorithms defined in the current CipherSpec. There is always an active CipherSpec, however initially it is SSL_NULL_WITH_NULL_NULL, which does not provide any security.

Once the handshake is complete, the two parties have shared secrets which are used to encrypt records and compute keyed message authentication codes (MACs) on their contents. The techniques used to perform the encryption and MAC operations are defined by the CipherSpec and constrained by CipherSpec.cipher_type. The encryption and MAC functions translate an SSLCompressed structure into an SSLCiphertext. The decryption functions reverse the process. Transmissions also include a sequence number so that missing, altered, or extra messages are detectable.

```
struct {
        ContentType type;
        ProtocolVersion version;
        uint16 length;
        select (CipherSpec.cipher_type) {
            case stream: GenericStreamCipher;
            case block: GenericBlockCipher;
        } fragment;
} SSLCiphertext;
``` type
   The type field is identical to SSLCompressed.type.

version
   The version field is identical to SSLCompressed.version.

length
   The length (in bytes) of the following SSLCiphertext.fragment. The length may not exceed $2^{14}$ + 2048.

fragment
   The encrypted form of SSLCompressed.fragment, including the MAC.

7.2.3.1 Null or standard stream cipher

Stream ciphers (including BulkCipherAlgorithm.null - See Appendix A.7) convert SSLCompressed.fragment structures to and from stream SSLCiphertext.fragment structures.

```
stream-ciphered struct {
          opaque content[SSLCompressed.length];
          opaque MAC[CipherSpec.hash_size];
} GenericStreamCipher;
```

The MAC is generated as:

```
hash(MAC_write_secret + pad_2 +
     hash (MAC_write_secret + pad_1 + seq_num + length + content));
``` where "+" denotes concatenation.

pad_1
    The character 0x36 repeated 48 time for MD5 or 40 times for SHA.

pad_2
    The character 0x5c repeated the same number of times.
seq_num
    The sequence number for this message.
hash
    The hashing algorithm derived from the cipher suite.

Note that the MAC is computed before encryption. The stream cipher encrypts the entire block, including the MAC. For stream ciphers that do not use a synchronization vector (such as RC4), the stream cipher state from the end of one record is simply used on the subsequent packet. If the CipherSuite is SSL_NULL_WITH_NULL_NULL, encryption consists of the identity operation (i.e., the data is not encrypted and the MAC size is zero implying that no MAC is used). SSLCiphertext.length is SSLCompressed.length plus CipherSpec.hash_size.

7.2.3.2 CBC block cipher

For block ciphers (such as RC2 or DES), the encryption and MAC functions convert
SSLCompressed.fragment structures to and from block SSLCiphertext.fragment structures.

```
block-ciphered struct {
        opaque content[SSLCompressed.length];
        opaque MAC[CipherSpec.hash_size];
        uint8 padding[GenericBlockCipher.padding_length];
        uint8 padding_length;
} GenericBlockCipher;
```

The MAC is generated as described in Section 7.2.3.1.

padding
    Padding that is added to force the length of the plaintext to be a multiple of the block
    cipher's block length.

padding_length
    The length of the padding must be less than the cipher's block length and may be zero.
    The padding length should be such that the total size of the GenericBlockCipher structure
    is a multiple of the cipher's block length.

The encrypted data length (SSLCiphertext.length) is one more than the sum of
SSLCompressed.length, CipherSpec.hash_size, and padding_length.

Note: With CBC block chaining the initialization vector (IV) for the first record is provided by the handshake protocol. The IV for subsequent records is the last ciphertext block from the previous record.

7.3 Change cipher spec protocol

The change cipher spec protocol exists to signal transitions in ciphering strategies. The protocol consists of a single message, which is encrypted and compressed under the *current* (not the *pending*) CipherSpec. The message consists of a single byte of value 1.

```
struct {
        enum { change_cipher_spec(1), (255) } type;
} ChangeCipherSpec;
```

The change cipher spec message is sent by both the client and server to notify the receiving party that subsequent records will be protected under the just-negotiated CipherSpec and keys.

Reception of this message causes the receiver to copy the *read pending* state into the *read current* state. Separate read and write states are maintained by both the SSL client and server. When the client or server receives a change cipher spec message, it copies the pending read state into the current read state. When the client or server writes a change cipher spec message, it copies the pending write state into the current write state. The client sends a change cipher spec message following handshake key exchange and certificate verify messages (if any), and the server sends one after successfully processing the key exchange message it received from the client. An unexpected change cipher spec message should generate an unexpected_message alert (Section 7.4.2). When resuming a previous session, the change cipher spec message is sent after the hello messages.

7.4 Alert protocol

One of the content types supported by the SSL Record layer is the *alert* type. Alert messages convey the severity of the message and a description of the alert. Alert messages with a level of fatal result in the immediate termination of the connection. In this case, other connections corresponding to the session may continue, but the session identifier must be invalidated, preventing the failed session from being used to establish new connections. Like other messages, Alert messages are encrypted and compressed, as specified by the current connection state.

```
enum { warning(1), fatal(2), (255) } AlertLevel;

enum {
        close_notify(0),
        unexpected_message(10),
        bad_record_mac(20),
        decompression_failure(30),
        handshake_failure(40), no_certificate(41), bad_certificate(42),
            unsupported_certificate(43), certificate_revoked(44),
            certificate_expired(45), certificate_unknown(46),
            illegal_parameter (47)
        (255)
} AlertDescription;

struct {
        AlertLevel level;
        AlertDescription description;
} Alert;
```

7.4.1 Closure alerts

The client and the server must share knowledge that the connection is ending in order to avoid a truncation attack. Either party may initiate the exchange of closing messages.

close_notify
> This message notifies the recipient that the sender will not send any more messages on this connection. The session becomes unresumable if any connection is terminated without proper close_notify messages with level equal to warning.

7.4.2 Error alerts

Error handling in the SSL Handshake protocol is very simple. When an error is detected, the detecting party sends a message to the other party. Upon transmission or receipt of an fatal alert message, both parties immediately close the connection. Servers and clients are required to forget any session-identifiers, keys, and secrets associated with a failed connection. The following error alerts are defined:

unexpected_message
> An inappropriate message was received. This alert is always fatal and should never be observed in communication between proper implementations.

bad_record_mac
> This alert is returned if a record is received with an incorrect MAC. This message is always fatal.

decompression_failure
> The decompression function received improper input (e.g. data that would expand to excessive length). This message is always fatal.

handshake_failure
: Reception of a handshake_failure alert message indicates that the sender was unable to negotiate an acceptable set of security parameters given the options available. This is a fatal error.

no_certificate
: A no_certificate alert message may be sent in response to a certification request if no appropriate certificate is available.

bad_certificate
: A certificate was corrupt, contained signatures that did not verify correctly, etc.

unsupported_certificate
: A certificate was of an unsupported type.

certificate_revoked
: A certificate was revoked by its signer.

certificate_expired
: A certificate has expired or is not currently valid.

certificate_unknown
: Some other (unspecified) issue arose in processing the certificate, rendering it unacceptable.

illegal_parameter
: A field in the handshake was out of range or inconsistent with other fields. This is always fatal.

7.5 Handshake protocol overview

The cryptographic parameters of the session state are produced by the SSL Handshake Protocol, which operates on top of the SSL Record Layer. When a SSL client and server first start communicating, they agree on a protocol version, select cryptographic algorithms, optionally authenticate each other, and use public-key encryption techniques to generate shared secrets. These processes are performed in the handshake protocol, which can be summarized as follows:

The client sends a client hello message to which the server must respond with a server hello message, or else a fatal error will occur and the connection will fail. The client hello and server hello are used to establish security enhancement capabilities between client and server. The client hello and server hello establish the following attributes: protocol version, session ID, cipher suite, and compression method. Additionally, two random values are generated and exchanged: ClientHello.random and ServerHello.random.

Following the hello messages, the server will send its certificate, if it is to be authenticated. Additionally, a server key exchange message may be sent, if it is required (e.g. if their server has no certificate, or if its certificate is for signing only). If the server is authenticated, it may request a certificate from the client, if that is appropriate to the cipher suite selected.

Now the server will send the server hello done message, indicating that the hello-message phase of the handshake is complete. The server will then wait for a client response.

If the server has sent a certificate request message, the client must send either the certificate message or a no certificate alert. The client key exchange message is now sent, and the content of that message will depend on the public key algorithm selected between the client hello and the server hello. If the client has sent a certificate with signing ability, a digitally-signed certificate verify message is sent to explicitly verify the certificate.

At this point, a change cipher spec message is sent by the client, and the client copies the *pending* Cipher Spec into the *current* Cipher Spec. The client then immediately sends the finished message under the new algorithms, keys, and secrets. In response, the server will send its own change cipher spec message, transfer the *pending* to the *current* Cipher Spec, and send its Finished message under the new Cipher Spec. At this point, the handshake is complete and the client and server may begin to exchange application layer data. (See flow chart below.)

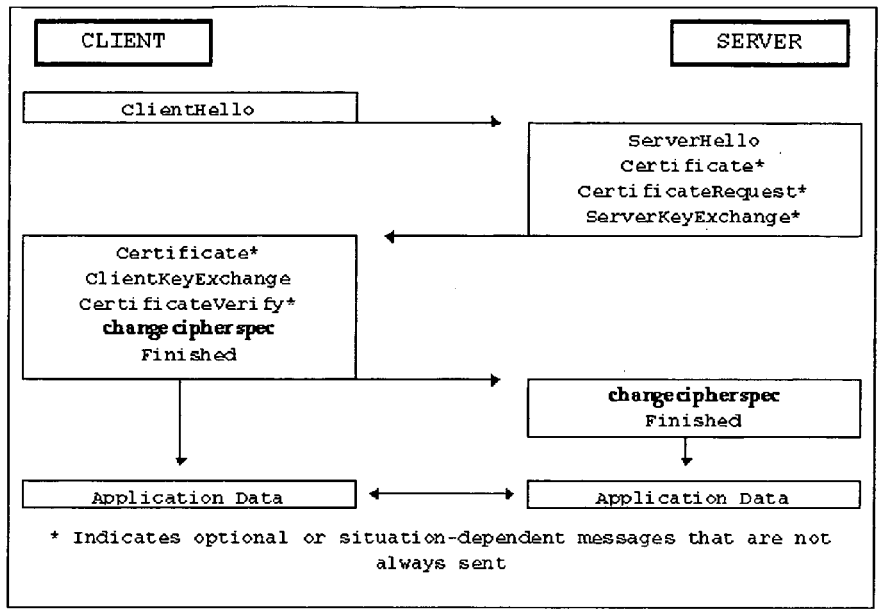

* Indicates optional or situation-dependent messages that are not always sent

Note: To help avoid pipeline stalls, ChangeCipherSpec is an independent SSL Protocol content type, and is not actually an SSL handshake message.

When the client and server decide to resume a previous session or duplicate an existing session (instead of negotiating new security parameters) the message flow is as follows:

The client sends a client hello using the Session ID of the session to be resumed. The Server then checks its session cache for a match. If a match is found, and the server is willing to re-establish the connection under the specified session state, it will send a server hello with the same Session ID value. At this point, both client and server must send change cipher spec messages and proceed directly to finished messages. Once the re-establishment is complete, the client and server may begin to exchange application layer data. (See flow chart below.) If a Session ID match is not found, the server generates a new session ID and the SSL client and server perform a full handshake.

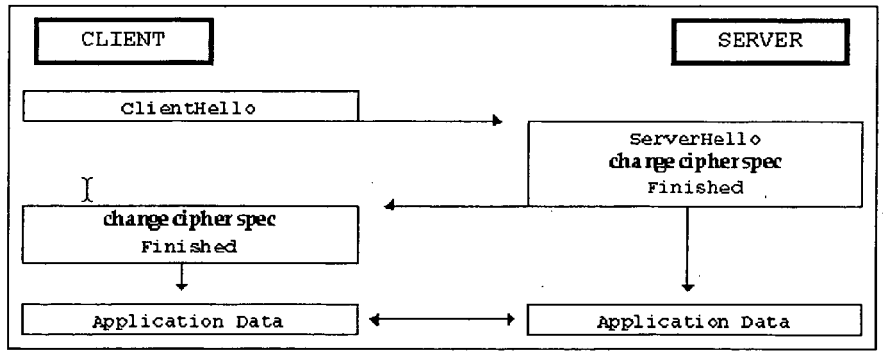

The contents and significance of each message will be presented in detail in the following sections.

7.6 Handshake protocol

The SSL Handshake Protocol is one of the defined higher level clients of the SSL Record Protocol. This protocol is used to negotiate the secure attributes of a *session*. Handshake messages are supplied to the SSL Record Layer, where they are encapsulated within one or more SSLPlaintext structures, which are processed and transmitted as specified by the current active session state.

```
enum {
        hello_request(0), client_hello(1), server_hello(2),
        certificate(11), server_key_exchange (12), certificate_request(13),
        server_hello_done(14), certificate_verify(15), client_key_exchange(16),
        finished(20), (255)
} HandshakeType;

struct {
        HandshakeType msg_type;         /* type of handshake message */
        uint24 length;  /* # bytes in handshake message body */
        select (HandshakeType) {
            case hello_request: HelloRequest;
            case client_hello: ClientHello;
            case server_hello: ServerHello;
            case certificate: Certificate;
            case server_key_exchange: ServerKeyExchange;
            case certificate_request: CertificateRequest;
            case server_hello_done: ServerHelloDone;
            case certificate_verify: CertificateVerify;
            case client_key_exchange: ClientKeyExchange;
            case finished: Finished;
        } body;
} Handshake;
```

The handshake protocol messages are presented in the order they must be sent; sending handshake messages in an unexpected order results in a fatal error.

7.6.1 Hello messages

The hello phase messages are used to exchange security enhancement capabilities between the client and server. When a new session begins, the CipherSpec encryption, hash, and compression algorithms are initialized to null. The current CipherSpec is used for renegotiation messages.

7.6.1.1 Hello request

The hello request message may be sent by the server at any time, but will be ignored by the client if the handshake protocol is already underway. It is a simple notification that the client should begin the negotiation process anew by sending a client hello message when convenient.

Note: Since handshake messages are intended to have transmission precedence over application data, it is expected that the negotiation begin in no more than one or two times the transmission time of a maximum length application data message.

After sending a hello request, servers should not repeat the request until the subsequent handshake negotiation is complete. A client that receives a hello request while in a handshake negotiation state should simply ignore the message.

The structure of a hello request message is as follows:

struct { } HelloRequest;

7.6.1.2 Client hello

When a client first connects to a server it is required to send the client hello as its first message. The client can also send a client hello in response to a hello request or on its own initiative in order to renegotiate the security parameters in an existing connection.

The client hello message includes a random structure, which is used later in the protocol.

SSL 3.0 Specification

```
struct {
   uint32 gmt_unix_time;
   opaque random_bytes[28];
} Random;
``` gmt_unix_time
    The current time and date in standard UNIX 32-bit format according to the sender's
    internal clock. Clocks are not required to be set correctly by the basic SSL Protocol;
    higher level or application protocols may define additional requirements.

random_bytes
    28 bytes generated by a secure random number generator.

The client hello message includes a variable length session identifier. If not empty, the value
identifies a session between the same client and server whose security parameters the client
wishes to reuse. The session identifier may be from an earlier connection, this connection, or
another currently active connection. The second option is useful if the client only wishes to
update the random structures and derived values of a connection, while the third option makes
it possible to establish several simultaneous independent secure connections without repeating
the full handshake protocol. The actual contents of the SessionID are defined by the server.

opaque SessionID<0..32>;

Warning: Servers must not place confidential information in session identifiers or let the
contents of fake session identifiers cause any breach of security.

The CipherSuite list, passed from the client to the server in the client hello message,
contains the combinations of cryptographic algorithms supported by the client in order of the
client's preference (first choice first). Each CipherSuite defines both a key exchange
algorithm and a CipherSpec. The server will select a cipher suite or, if no acceptable choices
are presented, return a handshake failure alert and close the connection.

uint8 CipherSuite[2];   /* Cryptographic suite selector */

The client hello includes a list of compression algorithms supported by the client, ordered
according to the client's preference. If the server supports none of those specified by the
client, the session must fail.

enum { null(0), (255) } CompressionMethod;

Issue: Which compression methods to support is under investigation.

The structure of the client hello is as follows.

```
struct {
      ProtocolVersion client_version;
      Random random;
      SessionID session_id;
      CipherSuite cipher_suites<2..2^16-1>;
      CompressionMethod compression_methods<1..2^8-1>;
} ClientHello;
``` client_version
    The version of the SSL protocol by which the client wishes to communicate during
    this session. This should be the most recent (highest valued) version supported by the
    client. For this version of the specification, the version will be 3.0 (See Appendix E
    for details about backward compatibility).

random
    A client-generated random structure.

session_id
    The ID of a session the client wishes to use for this connection. This field should
    be *empty* if no session_id is available or the client wishes to generate new security
    parameters.

http://home.netscape.com/eng/ssl3/3-SPEC.HTM    8/21/00 cipher_suites
    This is a list of the cryptographic options supported by the client, sorted with
    the client's first preference first. If the session_id field is not *empty* (implying a
    session resumption request) this vector must include at least the cipher_suite from that
    session. Values are defined in Appendix A.6.

compression_methods
    This is a list of the compression methods supported by the client, sorted by client
    preference. If the session_id field is not *empty* (implying a session resumption request)
    this vector must include at least the compression_method from that session. All
    implementations must support CompressionMethod.null.

After sending the client hello message, the client waits for a server hello message. Any other
handshake message returned by the server except for a hello request is treated as a fatal
error.

Implementation note: Application data may not be sent before a finished message has been sent.
Transmitted application data is known to be insecure until a valid finished message has been
received. This absolute restriction is relaxed if there is a current, non-null encryption on
this connection.

7.6.1.3 Server hello

The server processes the client hello message and responds with either a handshake_failure
alert or server hello message.

```
struct {
        ProtocolVersion server_version;
        Random random;
        SessionID session_id;
        CipherSuite cipher_suite;
        CompressionMethod compression_method;
} ServerHello;
``` server_version
    This field will contain the lower of that suggested by the client in the **client
    hello** and the highest supported by the server. For this version of the specification, the
    version will be 3.0 (See Appendix E for details about backward compatibility).

random
    This structure is generated by the server and *must* be different from (and
    independent of) ClientHello.random.

session_id
    This is the identity of the session corresponding to this connection. If the
    ClientHello.session_id was non-empty, the server will look in its session cache for a
    match. If a match is found and the server is willing to establish the new connection
    using the specified session state, the server will respond with the same value as was
    supplied by the client. This indicates a *resumed* session and dictates that the parties
    *must* proceed directly to the finished messages. Otherwise this field will contain a
    different value identifying the new session. The server may return an *empty* session_id to
    indicate that the session will not be cached and therefore cannot be resumed.

cipher_suite
    The single cipher suite selected by the server from the list in
    ClientHello.cipher_suites. For *resumed* sessions this field is the value from the state of
    the session being resumed.

compression_method
    The single compression algorithm selected by the server from the list in
    ClientHello.compression_methods. For *resumed* sessions this field is the value from the
    resumed session state.

7.6.2 Server certificate

If the server is to be authenticated (which is generally the case), the server sends its
certificate immediately following the server hello message. The certificate type must be
appropriate for the selected cipher suite's key exchange algorithm, and is generally an X.509.v3 certificate (or a modified X.509 certificate in the case of Fortezza [FOR]). The same
message type will be used for the client's response to a server certificate request message.

```
opaque ASN.1Cert<1..2^24-1>;

struct {
        ASN.1Cert certificate_list<1..2^24-1>;
} Certificate;
``` certificate_list This is a sequence (chain) of X.509.v3 certificates, ordered with the sender's
certificate first and the root certificate authority last.

Note: PKCS #7 [PKCS7] is not used as the format for the certificate vector because PKCS #6
[PKCS6] extended certificates are not used. Also PKCS #7 defines a SET rather than a SEQUENCE,
making the task of parsing the list more difficult.

7.6.3 Server key exchange message

The server key exchange message is sent by the server if it has no certificate, has a
certificate only used for signing (e.g., DSS [DSS] certificates, signing-only RSA [RSA]
certificates), or fortezza/DMS key exchange is used. This message is not used if the server
certificate contains Diffie-Hellman [DH1] parameters.

Note: According to current US export law, RSA moduli larger than 512 bits may not be used for
key exchange in software exported from the US. With this message, larger RSA keys may be used
as signature-only certificates to sign temporary shorter RSA keys for key exchange.

```
enum { rsa, diffie_hellman, fortezza_dms } KeyExchangeAlgorithm;

struct {
        opaque rsa_modulus<1..2^16-1>;
        opaque rsa_exponent<1..2^16-1>;
} ServerRSAParams;
``` rsa_modulus The modulus of the server's temporary RSA key.

rsa_exponent The public exponent of the server's temporary RSA key.

```
struct {
        opaque dh_p<1..2^16-1>;
        opaque dh_g<1..2^16-1>;
        opaque dh_Y_s<1..2^16-1>;
} ServerDHParams;      /* Ephemeral DH parameters */
``` dh_p
        The prime modulus used for the Diffie-Hellman operation.

dh_g
        The generator used for the Diffie-Hellman operation.

dh_Y_s
        The server's Diffie-Hellman public value ($g^X$ mod p).

```
struct {
        opaque r_s [128];
} ServerFortezzaParams;
``` r_s
        Server random number for Fortezza KEA (Key Exchange Algorithm).

```
struct {
        select (KeyExchangeAlgorithm) {
            case diffie_hellman:
                ServerDHParams params;
                Signature signed_params;
            case rsa:
                ServerRSAParams params;
```

```
                Signature signed_params;
        case fortezza_dms:
                ServerFortezzaParams params;
        };
} ServerKeyExchange;
``` params
> The server's key exchange parameters.

signed_params
> A hash of the corresponding params value, with the signature appropriate to that hash applied.

md5_hash
> MD5(ClientHello.random + ServerHello.random + ServerParams);

sha_hash
> SHA(ClientHello.random + ServerHello.random + ServerParams);

```
enum { anonymous, rsa, dsa } SignatureAlgorithm;

digitally-signed struct {
        select(SignatureAlgorithm) {
            case anonymous: struct { };
            case rsa:
                opaque md5_hash[16];
                opaque sha_hash[20];
            case dsa:
                opaque sha_hash[20];
        };
} Signature;
```

7.6.4 Certificate request

A non-anonymous server can optionally request a certificate from the client, if appropriate for the selected cipher suite.

```
opaque CertificateAuthority<0..2^24-1>;

enum {
        rsa_sign(1), dss_sign(2), rsa_fixed_dh(3), dss_fixed_dh(4),
        rsa_ephemeral_dh(5), dss_ephemeral_dh(6), fortezza_dms(20), (255)
} ClientCertificateType;

opaque DistinguishedName<1..2^16-1>;

struct {
        ClientCertificateType certificate_types<1..2^8-1>;
        DistinguishedName certificate_authorities<3..2^16-1>;
} CertificateRequest;
``` certificate_types
> This field is a list of the types of certificates requested, sorted in order of the server's preference.

certificate_authorities
> A list of the distinguished names of acceptable certificate authorities.

Note: DistinguishedName is derived from [X509].

Note: It is a fatal handshake_failure alert for an anonymous server to request client identification.

7.6.5 Server hello done

The server hello done message is sent by the server to indicate the end of the server hello and associated messages. After sending this message the server will wait for a client response.

```
struct { } ServerHelloDone;
```

Upon receipt of the server hello done message the client should verify that the server provided a valid certificate if required and check that the server hello parameters are acceptable.

7.6.6 Client certificate

This is the first message the client can send after receiving a server hello done message. This message is only sent if the server requests a certificate. If no suitable certificate is available, the client should send a no certificate alert instead. This error is only a warning, however the server may respond with a fatal handshake failure alert if client authentication is required.

Client certificates are sent using the Certificate defined in Section 7.6.2.

Note: Client Diffie-Hellman certificates must match the server specified Diffie-Hellman parameters.

7.6.7 Client key exchange message

The choice of messages depends on which public key algorithm(s) has (have) been selected. See Section 7.6.3 for the KeyExchangeAlgorithm.

```
struct {
      select (KeyExchangeAlgorithm) {
          case rsa: EncryptedPreMasterSecret;
          case diffie_hellman: ClientDiffieHellmanPublic;
          case fortezza_dms: FortezzaKeys;
      } exchange_keys;
} ClientKeyExchange;
```

The information to select the appropriate record structure is in the *pending* session state (see Section 7.1).

7.6.7.1 RSA encrypted premaster secret message

If RSA is being used for key agreement and authentication, the client generates a 48-byte premaster secret, encrypts it under the public key from the server's certificate or temporary RSA key from a server key exchange message, and sends the result in an encrypted premaster secret message.

```
struct {
      ProtocolVersion client_version;
      opaque random[46];
} PreMasterSecret;
``` client_version
    The latest (newest) version supported by the client. This is used to detect version roll-back attacks.

random
    46 securely-generated random bytes.

```
struct {
      public-key-encrypted PreMasterSecret pre_master_secret;
} EncryptedPreMasterSecret;
``` pre_master_secret
    This random value is generated by the client and is used to generate the *master secret*, as specified in Section 8.1.

7.6.7.2 Fortezza key exchange message

Under Fortezza DMS, the client derives a Token Encryption Key (TEK) using Fortezza's Key Exchange Algorithm (KEA). The client's KEA calculation uses the public key in the server's certificate along with private parameters in the client's token. The client sends public parameters needed for the server to generate the TEK, using its own private parameters. The client generates session keys, wraps them using the TEK, and sends the results to the server. The client generates IV's for the session keys and TEK and sends them also. The client generates a random 48-byte premaster secret, encrypts it using the TEK, and sends the result:

```
struct {
        opaque y_c<0..128>;
        opaque r_c[128];
        opaque y_signature[20];
        opaque wrapped_client_write_key[12];
        opaque wrapped_server_write_key[12];
        opaque client_write_iv[24];
        opaque server_write_iv[24];
        opaque master_secret_iv[24];
        block-ciphered opaque encrypted_pre_master_secret[48];
} FortezzaKeys;
``` y_signature
    y_singnature is the signature of the KEA public key, signed with the client's DSS private key.

y_c
    The client's $Y_c$ value (public key) for the KEA calculation. If the client has sent a certificate, and its KEA public key is suitable, this value must be *empty* since the certificate already contains this value. If the client sent a certificate without a suitable public key, y_c is used and y_singnature is the KEA public key signed with the client's DSS private key. For this value to be used, it must be between 64 and 128 bytes.

r_c
    The client's $R_c$ value for the KEA calculation.

wrapped_client_write_key
    This is the client's write key, wrapped by the TEK.

wrapped_server_write_key
    This is the server's write key, wrapped by the TEK.

client_write_iv
    This is the IV for the client write key.

server_write_iv
    This is the IV for the server write key.

master_secret_iv
    This is the IV for the TEK used to encrypt the pre-master secret.

pre_master_secret
    This is a random value, generated by the client and used to generate the *master secret*, as specified in Section 8.1. In the above structure, it is encrypted using the TEK.

7.6.7.3 Client Diffie-Hellman public value

This structure conveys the client's Diffie-Hellman public value ($Y_c$) if it was not already included in the client's certificate. The encoding used for $Y_c$ is determined by the enumerated PublicValueEncoding.

enum { implicit, explicit } PublicValueEncoding;

implicit
    If the client certificate already contains the public value, then it is implicit and $Y_c$ does not need to be sent again.

explicit
    $Y_c$ needs to be sent.

```
struct {
        select (PublicValueEncoding) {
            case implicit: struct { };
            case explicit: opaque dh_Yc<1..2^16-1>;
        } dh_public;
} ClientDiffieHellmanPublic;
``` dh_Yc
    The client's Diffie-Hellman public value ($Y_c$).

7.6.8 Certificate verify

This message is used to provide explicit verification of a client certificate. This message is only sent following any client certificate that has signing capability (i.e. all certificates except those containing fixed Diffie-Hellman parameters).

```
struct {
      Signature signature;
} CertificateVerify;
```

CertificateVerify.signature.md5_hash
    MD5(master_secret + pad2 + MD5(handshake_messages +
        master_secret + pad1));

Certificate.signature.sha_hash
    SHA(master_secret + pad2 + SHA(handshake_messages +
        master_secret + pad1));

Here handshake_messages refers to all handshake messages starting at client hello up to but not including this message.

7.6.9 Finished

A finished message is always sent immediately after a change cipher specs message to verify that the key exchange and authentication processes were successful. The finished message is the first protected with the just-negotiated algorithms, keys, and secrets. No acknowledgment of the finished message is required; parties may begin sending confidential data immediately after sending the finished message. Recipients of finished messages must verify that the contents are correct.

enum { client(0x434C4E54), server(0x53525652) } Sender;

```
struct {
        opaque md5_hash[16];
        opaque sha_hash[20];
} Finished;
``` md5_hash
    MD5(master_secret + pad2 + MD5(handshake_messages +
        Sender + master_secret + pad1));

sha_hash
    SHA(master_secret + pad2 + SHA(handshake_messages +
        Sender + master_secret + pad1));

The hash contained in finished messages sent by the server incorporate Sender.server; those sent by the client incorporate Sender.client. The value handshake_messages includes all handshake messages starting at client hello up to, but not including, the finished messages. This may be different from handshake_messages in Section 7.6.8 because it would include the certificate verify message (if sent).

Note: Change cipher spec messages are not handshake messages and are not included in the hash computations.

7.7 Application data protocol

Application data messages are carried by the Record Layer and are fragmented, compressed and encrypted based on the current connection state. The messages are treated as *transparent data* to the record layer.

8. Cryptographic computations

The key exchange, authentication, encryption, and MAC algorithms are determined by the cipher_suite selected by the server and revealed in the server hello message.

8.1 Asymmetric cryptographic computations

The asymmetric algorithms are used in the handshake protocol to authenticate parties and to generate shared keys and secrets.

For Diffie-Hellman, RSA, and Fortezza, the same algorithm is used to convert the pre_master_secret into the master_secret. The pre_master_secret should be deleted from memory once the master_secret has been computed.

```
master_secret =
        MD5(pre_master_secret + SHA('A' + pre_master_secret +
            ClientHello.random + ServerHello.random)) +
        MD5(pre_master_secret + SHA('BB' + pre_master_secret +
            ClientHello.random + ServerHello.random)) +
        MD5(pre_master_secret + SHA('CCC' + pre_master_secret +
            ClientHello.random + ServerHello.random));
```

8.1.1 RSA

When RSA is used for server authentication and key exchange, a 48-byte pre_master_secret is generated by the client, encrypted under the server's public key, and sent to the server. The server uses its private key to decrypt the pre_master_secret. Both parties then convert the pre_master_secret into the master_secret, as specified above.

RSA digital signatures are performed using PKCS #1 [PKCS1] block type 1. RSA public key encryption is performed using PKCS #1 block type 2.

8.1.2 Diffie-Hellman

A conventional Diffie-Hellman computation is performed. The negotiated key (Z) is used as the pre_master_secret, and is converted into the master_secret, as specified above.

Note: Diffie-Hellman parameters are specified by the server, and may be either ephemeral or contained within the server's certificate.

8.1.3 Fortezza

A random 48-byte pre_master_secret is sent encrypted under the TEK and its IV. The server decrypts the pre_master_secret and converts it into a master_secret, as specified above. Bulk cipher keys and IVs for encryption are generated by the client's token and exchanged in the key exchange message; the master_secret is only used for MAC computations.

8.2 Symmetric cryptographic calculations and the CipherSpec

The technique used to encrypt and verify the integrity of SSL records is specified by the currently active CipherSpec. A typical example would be to encrypt data using DES and generate authentication codes using MD5. The encryption and MAC algorithms are set to SSL_NULL_WITH_NULL_NULL at the beginning of the SSL Handshake Protocol, indicating that no message authentication or encryption is performed. The handshake protocol is used to negotiate a more secure CipherSpec and to generate cryptographic keys.

8.2.1 The master secret

Before secure encryption or integrity verification can be performed on records, the client and server need to generate shared secret information known only to themselves. This value is a 48-byte quantity called the *master secret*. The master secret is used to generate keys and secrets for encryption and MAC computations. Some algorithms, such as Fortezza, may have their own procedure for generating encryption keys (the master secret is used only for MAC computations in Fortezza).

8.2.2 Converting the master secret into keys and MAC secrets

The master secret is hashed into a sequence of secure bytes, which are assigned to the MAC secrets, keys, and non-export IVs required by the current CipherSpec (see Appendix A.7).

CipherSpecs require a *client write MAC secret*, a *server write MAC secret*, a *client write key*, a *server write key*, a *client write IV*, and a *server write IV*, which are generated from the master secret in that order. Unused values, such as Fortezza keys communicated in the KeyExchange message, are *empty*. The following inputs are available to the key definition process:

```
opaque MasterSecret[48]
ClientHello.random
ServerHello.random
```

When generating keys and MAC secrets, the master secret is used as an entropy source, and the random values provide unencrypted salt material and IVs for exportable ciphers.

To generate the key material, compute

```
key_block =
        MD5(master_secret + SHA('A' + master_secret + ServerHello.random +
            ClientHello.random)) +
        MD5(master_secret + SHA('BB' + master_secret + ServerHello.random +
            ClientHello.random)) +
        MD5(master_secret + SHA('CCC' + master_secret + ServerHello.random +
            ClientHello.random)) + [...];
``` until enough output has been generated. Then the key_block is partitioned as follows.

```
client_write_MAC_secret[CipherSpec.hash_size]
server_write_MAC_secret[CipherSpec.hash_size]
client_write_key[CipherSpec.key_material]
server_write_key[CipherSPec.key_material]
client_write_IV[CipherSpec.IV_size]            /* non-export ciphers */
server_write_IV[CipherSpec.IV_size]            /* non-export ciphers */
```

Any extra key_block material is discarded.

Exportable encryption algorithms (for which CipherSpec.is_exportable is true) require additional processing as follows to derive their final write keys:

```
final_client_write_key = MD5(client_write_key +
        ClientHello.random + ServerHello.random);
final_server_write_key = MD5(server_write_key +
        ServerHello.random + ClientHello.random);
```

Exportable encryption algorithms derive their IVs from the random messages:

```
client_write_IV = MD5(ClientHello.random + ServerHello.random);
server_write_IV = MD5(ServerHello.random + ClientHello.random);
```

MD5 outputs are trimmed to the appropriate size by discarding the least-significant bytes.

8.2.2.1 Export key generation example

SSL_RSA_EXPORT_WITH_RC2_CBC_40_MD5 requires five random bytes for each of the two encryption keys and 16 bytes for each of the MAC keys, for a total of 42 bytes of key material. MD5 produces 16 bytes of output per call, so three calls to MD5 are required. The MD5 outputs are concatenated into a 48-byte key_block with the first MD5 call providing bytes zero through 15, the second providing bytes 16 through 31, etc. The key_block is partitioned, and the write keys are salted because this is an exportable encryption algorithm.

```
client_write_MAC_secret = key_block[0..15]
server_write_MAC_secret = key_block[16..31]
client_write_key        = key_block[32..36]
server_write_key        = key_block[37..41]

final_client_write_key = MD5 (client_write_key +
        ClientHello.random + ServerHello.random) [0..15];
final_server_write_key = MD5 (server_write_key +
        ServerHello.random + ClientHello.random) [0..15];

client_write_IV = MD5(ClientHello.random + ServerHello.random) [0..7];
server_write_IV = MD5(ServerHello.random + ClientHello.random) [0..7];
```

The invention claimed is:

1. A method for performing secured communications between a Voice Browser and a network device, said Voice Browser and network device exchanging VoiceXML-based Web content comprising the steps of:
   a Voice Browser receiving an audible request from a user, said audible request being a request for Web content;
   responsive to said audible request, the Voice Browser transmitting a request to the network device associated with the Web-based content to establish a secured communication session between the Voice Browser and the network device;
   authenticating the network device;
   subsequent to said authentication, negotiating a shared secret between the network device and the Voice Browser;
   encrypting the VoiceXML-based Web content using said shared secret as an encryption key;
   exchanging the encrypted VoiceXML-based Web content between the network device and the Voice Browser;
   decrypting the VoiceXML-based Web content using said shared secret as a decryption key; and
   the Voice Browser audibly presenting the decrypted Web content to said user.

2. The method of claim 1, wherein said step of authenticating the network device comprises the steps of:
   transmitting a digital certificate from the network device to the Voice Browser, said digital certificate having a public key and a reference to a certificate authority; and,
   validating said certificate authority.

3. The method of claim 2, wherein said digital certificate is an X.509-compliant digital certificate.

4. The method of claim 1, further comprising the step of authenticating the Voice Browser.

5. The method of claim 4, wherein said step of authenticating the Voice Browser comprises the steps of:
   transmitting a digital certificate from the Voice Browser to the network device, said digital certificate having a public key and a reference to a certificate authority; and,
   validating said certificate authority.

6. The method of claim 5, wherein said digital certificate is an X.509-compliant digital certificate.

7. The method of claim 2, wherein said step of authenticating the network device further comprises the step of challenging the network device.

8. The method of claim 5, wherein said step of authenticating the Voice Browser further comprises the step of challenging the Voice Browser.

9. The method of claim 7, wherein said step of challenging the network device comprises the steps of:
   encrypting a message using said public key contained in said digital certificate;
   transmitting said encrypted message from the Voice Browser to the network device;
   decrypting said encrypted message using a private key corresponding to said public key; and,
   transmitting the decrypted message to the Voice Browser.

10. The method of claim 8, wherein said step of challenging the Voice Browser comprises the steps of:
    encrypting a message using said public key contained in said digital certificate;
    transmitting said encrypted message from the network device to the Voice Browser;
    decrypting said encrypted message using a private key corresponding to said public key; and,
    transmitting the decrypted message to the network device.

11. The method of claim 1, wherein said negotiating step comprises the steps of:
    generating a key for use in a symmetric cryptographic algorithm;
    encrypting said generated key with said public key;
    transmitting said encrypted key to the network device; and,
    decrypting said key in the network device with a private key corresponding to said public key.

12. The method of claim 1, wherein said negotiating step comprises the steps of:
    generating a key for use in a symmetric cryptographic algorithm;
    encrypting said generated key with said public key;
    transmitting said encrypted key to the Voice Browser; and,
    decrypting said key in the Voice Browser with a private key corresponding to said public key.

13. The method of claim 1, further comprising the steps of:
    exchanging a list of supported symmetrical cryptographic algorithms for the network device and the Voice Browser;
    selecting a symmetrical cryptographic algorithm from said list; and,
    performing said encrypting and decrypting steps using said selected symmetrical cryptographic algorithm.

14. The method of claim 1, wherein said Voice Browser is a VoiceXML Browser Server.

15. A method for performing secured communications in a Voice Browser comprising the steps of:
    a Voice Browser receiving an audible request from a user, said audible request being a request for Web content;
    responsive to said audible request, the Voice Browser transmitting a request from the Voice Browser to a network device associated with the Web-based content for a secure communications session between the Voice Browser and the network device;
    receiving from the network device a digital certificate containing a public key and a reference to a certificate authority,
    authenticating the network device based on the digital certificate;
    subsequent to said authentication, negotiating a shared secret with the network device;
    encrypting data using said shared secret as an encryption key and transmitting said encrypted data to the network device;
    receiving encrypted Web content from the network device and decrypting the Web content using said shared secret as a decryption key; and,
    the Voice Browser audibly presenting the decrypted Web content to said user.

16. The method of claim 15, wherein said transmitting step further comprises the step of:
    transmitting to said network device a list of supported encryption algorithms for use in said encryption and decryption steps,
    said network device selecting an encryption algorithm from among said list.

17. The method of claim 16, wherein said data is encrypted using said selected encryption algorithm and said Web content is decrypted using said encryption algorithm.

18. The method of claim 15, wherein said digital certificate is an X.509-compliant digital certificate.

19. The method of claim 15, wherein said Web content is a VoiceXML document.

20. The method of claim 19, wherein said Voice Browser is a VoiceXML Browser Server.

21. A machine readable storage, having stored thereon a computer program for performing secured communications between a Voice Browser and a network device, said Voice Browser and network device exchanging VoiceXML-based Web content, said computer program having a plurality of code sections executable by a machine for causing the machine to perform the steps of:
- a voice browser receiving an audible request from a user, said audible request being a request for Web content;
- responsive to said audible request, the Voice Browser transmitting a request to the network device associated with the Web-based content to establish a secured communication session between the Voice Browser and the network device;
- authenticating the network device;
- subsequent to said authentication, negotiating a shared secret between the network device and the Voice Browser;
- encrypting the VoiceXML-based Web content using said shared secret as an encryption key;
- exchanging the encrypted VoiceXML-based Web content between the network device and the Voice Browser;
- decrypting the Voice-based Web content using said shared secret as a decryption key; and
- the Voice Browser audibly presenting the decrypted Web content to said user.

22. The machine readable storage of claim 21, wherein said step of authenticating the network device comprises the steps of:
- transmitting a digital certificate from the network device to the Voice Browser, said digital certificate having a public key and a reference to a certificate authority; and,
- validating said certificate authority.

23. The machine readable storage of claim 22, wherein said digital certificate is an X.509-compliant digital certificate.

24. The machine readable storage of claim 21, for further causing the machine to perform the step of authenticating the Voice Browser.

25. The machine readable storage of claim 24, wherein said step of authenticating the Voice Browser comprises the steps of:
- transmitting a digital certificate from the Voice Browser to the network device, said digital certificate having a public key and a reference to a certificate authority; and,
- validating said certificate authority.

26. The machine readable storage of claim 25, wherein said digital certificate is an X.509-compliant digital certificate.

27. The machine readable storage of claim 22, wherein said step of authenticating the network device further comprises the step of challenging the network device.

28. The machine readable storage of claim 25, wherein said step of authenticating the Voice Browser further comprises the step of challenging the Voice Browser.

29. The machine readable storage of claim 27, wherein said step of challenging the network device comprises the steps of:
- encrypting a message using said public key contained in said digital certificate;
- transmitting said encrypted message from the Voice Browser to the network device;
- decrypting said encrypted message using a private key corresponding to said public key; and,
- transmitting the decrypted message to the Voice Browser.

30. The machine readable storage of claim 28, wherein said step of challenging the Voice Browser comprises the steps of:
- encrypting a message using said public key contained in said digital certificate;
- transmitting said encrypted message from the network device to the Voice Browser;
- decrypting said encrypted message using a private key corresponding to said public key; and,
- transmitting the decrypted message to the network device.

31. The machine readable storage of claim 21, wherein said negotiating step comprises the steps of:
- generating a key for use in a symmetric cryptographic algorithm;
- encrypting said generated key with said public key;
- transmitting said encrypted key to the network device; and,
- decrypting said key in the network device with a private key corresponding to said public key.

32. The machine readable storage of claim 21, wherein said negotiating step comprises the steps of:
- generating a key for use in a symmetric cryptographic algorithm;
- encrypting said generated key with said public key;
- transmitting said encrypted key to the Voice Browser; and,
- decrypting said key in the Voice Browser with a private key corresponding to said public key.

33. The machine readable storage of claim 21, for further causing the machine to perform the steps of:
- exchanging a list of supported symmetrical cryptographic algorithms for the network device and the Voice Browser;
- selecting a symmetrical cryptographic algorithm from said list; and,
- performing said encrypting and decrypting steps using said selected symmetrical cryptographic algorithm.

34. The machine readable storage of claim 21, wherein said Voice Browser is a VoiceXML Browser Server.

35. A machine readable storage, having stored thereon a computer program for performing secured communications in a Voice Browser, said computer program having a plurality of code sections executable by a machine for causing the machine to perform the steps of:
- a Voice Browser receiving an audible request from a user, said audible request being a request for Web content;
- responsive to said audible request the Voice Browser transmitting a request from the Voice Browser to a network device associated with the Web-based content for a secure communications session between the Voice Browser and the network device;
- receiving from the network device a digital certificate containing a public key and a reference to a certificate authority;
- authenticating the network device based on the digital certificate;
- subsequent to said authentication, negotiating a shared secret with the network device;
- encrypting data using said shared secret as an encryption key and transmitting said encrypted data to the network device;

receiving encrypted Web content from the network device and decrypting the Web content using said shared secret as a decryption key; and, the Voice Browser audibly presenting the decrypted Web content to said user.

36. The machine readable storage of claim 35, wherein said transmitting step further comprises the step of:

transmitting to said network device a list of supported encryption algorithms for use in said encryption and decryption steps, said network device selecting an encryption algorithm from among said list.

37. The machine readable storage of claim 36, wherein said data is encrypted using said selected encryption algorithm and said Web content is decrypted using said encryption algorithm.

38. The machine readable storage of claim 35, wherein said digital certificate is an X.509-compliant digital certificate.

39. The machine readable storage of claim 35, wherein said Web content is a VoiceXML document.

40. The machine readable storage of claim 39, wherein said Voice Browser is a VoiceXML Browser Server.

* * * * *